(12) United States Patent
Welborn et al.

(10) Patent No.: US 7,104,026 B2
(45) Date of Patent: *Sep. 12, 2006

(54) APPARATUS FOR PACKING

(75) Inventors: Kenneth M. Welborn, Charlottesville, VA (US); Gregg A. Martin, Charlottesville, VA (US); Steven N. Tomlin, Crimora, VA (US); Jimmy L. Meyer, Waynesboro, VA (US); Colin R. Hart, Ankeny, IA (US)

(73) Assignee: F.R. Drake Company, Waynesboro, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/759,531

(22) Filed: Jan. 20, 2004

(65) Prior Publication Data

US 2004/0206054 A1 Oct. 21, 2004

Related U.S. Application Data

(63) Continuation-in-part of application No. 10/143,843, filed on May 14, 2002, now Pat. No. 6,679,033.

(60) Provisional application No. 60/290,342, filed on May 14, 2001.

(51) Int. Cl.
*B65B 1/04* (2006.01)

(52) U.S. Cl. .............................. 53/247; 53/242; 53/243; 53/250

(58) Field of Classification Search ................... 53/473, 53/475, 242, 243, 245, 247, 250, 251; 414/420; 198/403, 409
See application file for complete search history.

(56) References Cited

U.S. PATENT DOCUMENTS

| 3,475,877 | A | | 11/1969 | Fuller et al. |
| 3,791,099 | A | | 2/1974 | Wagner |
| 4,028,864 | A | | 6/1977 | Bell |
| 5,042,233 | A | | 8/1991 | Huang et al. |
| 5,136,826 | A | | 8/1992 | Carson et al. |
| 5,515,664 | A | * | 5/1996 | Tanaka et al. ................. 54/473 |
| 6,213,707 | B1 | * | 4/2001 | Liehs et al. .................. 414/421 |
| 6,719,519 | B1 | * | 4/2004 | Liehs ........................... 414/419 |

* cited by examiner

*Primary Examiner*—Louis K. Huynh
*Assistant Examiner*—Hemant M. Desai
(74) *Attorney, Agent, or Firm*—Berenato, White & Stavish, LLC

(57) ABSTRACT

A packing method and system are disclosed which system includes a first platform having a product support surface for supporting a product and a second platform for supporting a box into which the product is to be packed. After a box is received on and secured to the second platform, the second platform is rotated so that the open top of the box faces the first platform and moved toward the first platform until the box substantially surrounds the product on the product support surface. The first and second platforms are then rotated simultaneously so that the product is transferred from the product support to the box, and the full box is discharged to a discharge conveyor.

14 Claims, 33 Drawing Sheets

APPARATUS FOR PACKING

CROSS-REFERENCE TO RELATED APPLICATIONS AND CLAIM TO PRIORITY

The present application is a continuation-in-part of U.S. patent application Ser. No. 10/143,843, filed May 14, 2002, now U.S. Pat. No. 6,679,033 issued on Jan. 20, 2004, which claims the benefit of U.S. provisional patent application Ser. No. 60/290,342, filed May 14, 2001, the disclosures of which are incorporated herein by reference and to which priority is claimed.

FIELD OF THE INVENTION

The present invention is directed to a method and apparatus for packaging a product, and, more specifically, toward a method and apparatus for transferring a plurality of stacks of discrete objects supported by a platform from the platform to a box while maintaining the integrity and arrangement of the stacks.

BACKGROUND OF THE INVENTION

Various packing or packaging machines are known for placing a product into a box, carton, or other container. However, special problems are encountered when the product to be packaged comprises stacks of discrete objects. These stacks, for example, may have previously been formed by a stacking machine and set on a support surface for further processing. Such stacks can be lifted manually and placed into a box, but if multiple stacks have to be placed in the same box, it can be difficult to maintain the integrity of the stacks as they are moved; this leads to the occasional need for a manual restacking step. Furthermore, it is difficult to lift multiple adjacent stacks of objects at the same time by hand, and therefore a person would normally be limited to lifting the stacks one at a time when placing them in a box. However, if the stacks are to be packed tightly in the box, that is, if they are to be packed with a minimal amount of space between the stacks themselves and between the stacks and the inner walls of the box, it may be difficult to manually position the stacks that are adjacent a sidewall, and especially difficult to place the last stack into a box, which stack will be bounded on four sides by box sidewalls or other stacks of products.

Stacks of products such as those discussed above can be moved by gripping the top and bottom of the stack and applying pressure to hold the stack together while it is moved. An apparatus for gripping and moving stacks in this manner is disclosed in a co-pending application entitled "Stack Transfer Device" filed concurrently herewith and assigned to the assignee of this application, the disclosure of which is hereby incorporated by reference. However, gripping a stack from the top and bottom makes it difficult to insert the stack into a previously formed box having an open top. To package a stack that is gripped in this manner, either a box must be formed around the stacks of objects while they are being gripped, or the objects must be deposited on a surface and moved again from the surface to a box.

When using a stack transfer device, such as the one disclosed in the above application, the stacks are often placed on a device called a matrix former before they are packaged. A matrix former comprises a horizontal platform and two or three upstanding, movable sidewalls forming a structure that resembles a cube with an open top and no front wall. The purpose of the matrix former is to consolidate several stacks by sliding them toward one another and removing the spaces therebetween, to make them easier to fit into a box. The upstanding walls of the matrix former, however, make it even more difficult to transfer the stacks from the matrix former to a pre-formed box or case. It would therefore be desirable to provide a method and apparatus for automatically, simultaneously, transferring a plurality of stacks of discrete objects from a support platform, such as a matrix former, to a box in a manner that preserves the integrity and arrangement of the stacks.

SUMMARY OF THE INVENTION

These problems and others are addressed by the present invention which comprises a method and apparatus for transferring objects, and especially multiple stacks of discrete objects, from a support surface to an open-topped box. While the present invention could be used in a number of environments, it finds particular use in transferring stacks of frozen hamburger patties from a support surface having upstanding walls to an open-topped cardboard box and will be described in terms of such as system, it being understood that the invention is by no means limited to use in such environments.

The preferred embodiment of the invention comprises a first generally horizontal platform, which forms a part of a matrix former, on which a plurality of stacks of discrete objects are to be placed, and a second platform for supporting a box into which the stacks are to be packed. The second platform is movable vertically and can also be pivoted about an axis parallel to its box-contacting surface. The second platform includes at least one gripper for holding the bottom of the box securely against the box-contacting surface and, preferably, also includes a plurality of fingers for engaging the top edges of the box to control the movement of the box and to hold down flaps extending from the top edge of the box. The box-contacting surface of the second platform also preferably includes a plurality of rollers that allow an empty box to roll on and off the platform when the platform is inclined.

In operation, the second platform is aligned with a conveyor that feeds empty boxes one at a time. A box rolls onto the second platform and is gripped by at least one gripper on the second platform to hold it in place, with its bottom on rollers and its open top facing away from the rollers. The second platform is then pivoted 180 degrees to an inverted position, with the open box top positioned over and facing down towards the first platform above the stacks of objects on the first platform. The second platform is next lowered over the stacked objects, until the first platform is about even with or slightly inside the top opening of the box so that the stacks of objects are disposed completely within the box. The orientation of the stacked objects is maintained by the walls of the box and the platform. The first and second platforms are pivoted together, until the top opening of the box is again facing upwardly and the objects are supported on the closed bottom of the box rather than by the first platform. The second platform and box are moved away from the first support, so the first support may return to its original orientation. The second support is then moved to a discharge location where it tilts to slide the fully loaded box onto a conveyor for further processing, and finally the second support returns to its original position to receive another empty box from the feeding conveyor to start the process again.

It is therefore a principal object of the present invention to provide an apparatus for packing a plurality of stacks of discrete objects in a container.

It is another object of the invention to provide an apparatus for transferring a plurality of stacks of discrete objects from a platform to a box while maintaining the integrity and mutual relationship of the stacks.

It is a further object of the invention to provide a method for packing a plurality of stacks of discrete objects in a box.

It is still another object of the invention to provide a method of packing stacks of discrete objects supported by a platform having at least one upstanding sidewall taller than the stacks of objects.

It is yet another object of the invention to provide an apparatus for simultaneously boxing a matrix of discrete objects.

In furtherance of these objects, a packing apparatus is provided that includes a first platform having a product contact surface. The first platform is pivotable about an axis parallel to and spaced from the product contact surface between a first position, wherein the product contact surface faces in a first direction, and a second position, wherein the product contact surface faces in a second direction. The apparatus also includes a second platform comprising a box support having a box contact side and a box holder for holding a box on the box support. The second platform is movable between a first position and a second position, and the box support is pivotable between a first angular orientation and a second angular orientation.

Another aspect of the invention comprises a method of packing a product that involves providing a first platform having a product support surface facing in a first direction and placing a product to be packaged on the product support surface. A second platform including a box support having a box contact surface is aligned with a first conveyor and receives a box having a closed bottom and an open top. The box is secured to the box support with the closed bottom in contact with the box contact surface. The box support is pivoted so that the box contact surface faces the first platform product support surface and the box open top faces the product. The second platform is moved towards the first platform until the product passes through the box top opening, and the first platform and the box support platform are pivoted until the box open top faces in the first direction. The second platform is moved away from the first platform, and the first platform is pivoted until the product support surface faces in the first direction. The second platform is aligned with a second conveyor, and the box is released onto the second conveyor.

Another aspect of the invention comprises a packing apparatus that includes a first platform having a product contact surface that is pivotable, via an actuator, about an axis parallel to and spaced from the product contact surface between a first position, wherein the product contact surface faces in a first direction, and a second position, wherein the product contact surface faces in a second direction. The apparatus also includes a second platform that includes a box support having a first wall and a box contact side and a positioning device for positioning and holding a box on the box support. The positioning device includes a second, movable, wall and an actuator for moving the movable wall with respect to the first wall. At least one gripper is also provided for gripping an edge of a box having a closed bottom and open top on the box support. The second platform is movable between a first position and a second position, and the box support is pivotable between a first angular orientation and a second angular orientation with respect to said first platform. The apparatus also includes at least one guide track for guiding the movement of the second platform between the first position and the second position, a drive belt extending between a first wheel and a second wheel, and a drive operably coupled to the drive belt. The second platform is coupled to the drive belt.

Another aspect of the present invention provides a packing apparatus comprising a matrix former and a platform. The matrix former has a product contact surface and an at least one sidewall. The sidewall is movable relative to the product contact surface. The matrix former is pivotable about an axis parallel to and spaced from the product contact surface between a first position wherein the product contact surface faces in a first direction and a second position wherein the product contact surface faces in a second direction. The platform comprises a box support having a box contact side and a box holder for holding a box having a closed bottom and open top on the box support. The platform is pivotable between a first angular orientation and a second angular orientation.

A packing apparatus according to another embodiment comprises a matrix former, a platform, a lift cage, and a lowerator. The matrix former has a product contract surface pivotable about a first axis between a first position wherein the product contact surface faces in a first direction, and a second position wherein the product contact surface faces in a second direction. The platform is pivotable about a second axis spaced from the first axis. The platform is pivotable between a first position wherein the platform faces in a first direction and a second position wherein the product contact surface faces in a second direction. The lift cage is moveable between and aligned with the platform in the second position and the product contact surface in the first position. The lift cage moves a box therebetween. The lowerator is moveable between and aligned with the product contact surface in the second position and a discharge roller. A method of packing a product comprising the steps of: providing a first platform having a product support surface pivotable about a first axis between a first position and a second position; placing a product to be packaged on the product support surface in the first position; providing a second platform including a box support pivotable about a second axis spaced from the first axis, the second platform pivotable between a first position and a second position; receiving a box having a closed bottom and an open top on the second platform, the closed bottom adjacent the platform; securing the box to the second platform; aligning the open top with the first platform in the first position by pivoting the second platform to the second position; providing a first lift aligned with and extending between the first platform in the first position and the second platform in the second position; providing a second lift aligned with and extending between the first platform in the second position and a discharge roller; moving the first lift from the second platform in the second position towards the first platform in the first position until the product passes through the open top of the box; aligning the closed bottom of the box with discharge roller by pivoting the first platform to the second position; moving the second lift from toward the discharge roller until the closed bottom contacts the discharge roller; and releasing the box onto the discharge roller.

BRIEF DESCRIPTION OF THE DRAWINGS

These and other objects and other objects and advantages of the invention will be better understood after a reading of the following detailed description of the invention together with the following drawings.

DETAILED DESCRIPTION OF THE INVENTION

Figure 1:
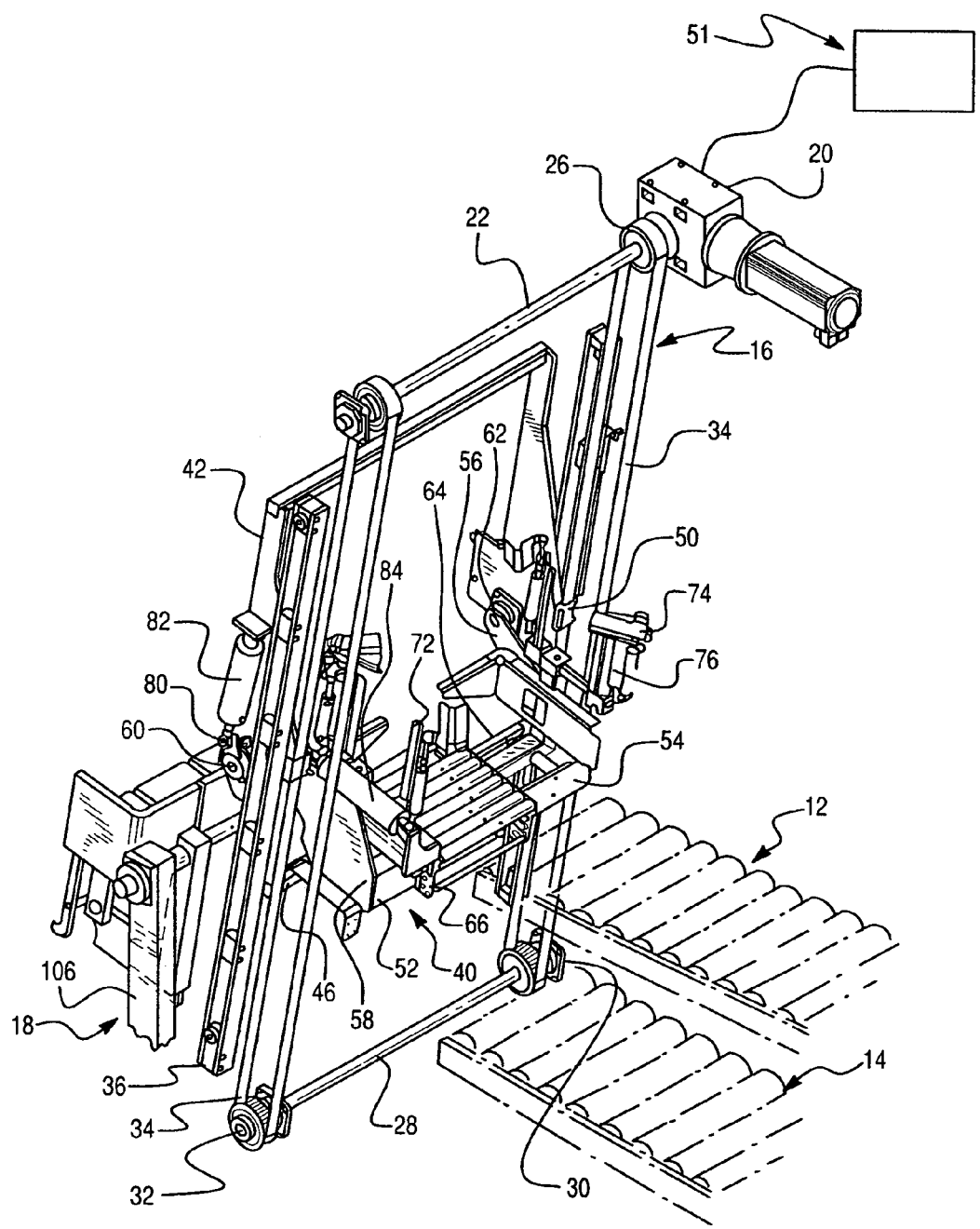
FIG. 1 is a perspective view of the packing system of the present invention which system includes a feeding conveyor, a discharge conveyor, a lift apparatus and a matrix former.

Referring now to FIGS. 1–19, wherein the showings are for the purpose of illustrating a first embodiment of the invention only, and not for the purpose of limiting same, FIG. 1 shows a packing apparatus designated generally by the numeral 10 which includes an empty-box feeding conveyor 12, a packed-box discharge conveyor 14, a lift mechanism 16, and a matrix former 18.

Figure 2:
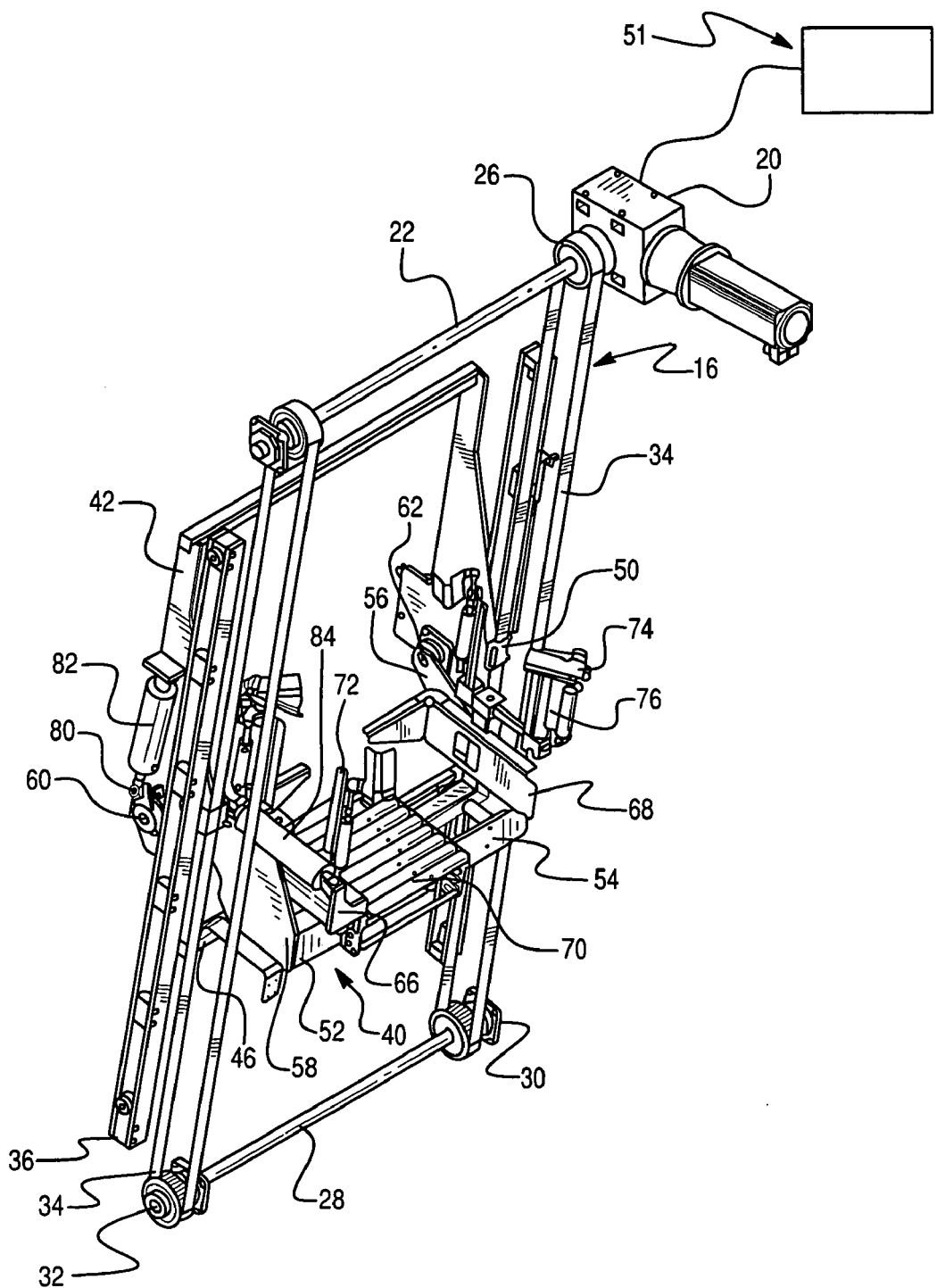
FIG. 2 is an assembly diagram of the lift apparatus of the packing system shown in FIG. 1.

Lift mechanism 16, as best shown in FIG. 2, includes a reversible motor 20 for turning a drive shaft 22 which is supported on one end by motor 20 and on the other by a bearing 24 mounted on a support (not shown). First and second flanged wheels 26 are mounted on shaft 22 for rotation therewith, and a second shaft 28 is rotatably supported by first and second bearing plates 30 mounted to supports (not shown) parallel to the drive shaft 22. First and second flanged wheels 32 are mounted on second shaft 28 and aligned with the flanged wheels 26 on the drive shaft 22. First and second belts 34 extend between aligned pairs of flanged wheels 26 and 32 on the shafts 22 and 28 such that shafts 22 and 28 are rotated simultaneously when motor 20 turns drive shaft 22. Parallel guide tracks 36 are mounted adjacent the belts 34, each track 36 defining a channel facing toward the channel of the other track 36.

Figure 7:
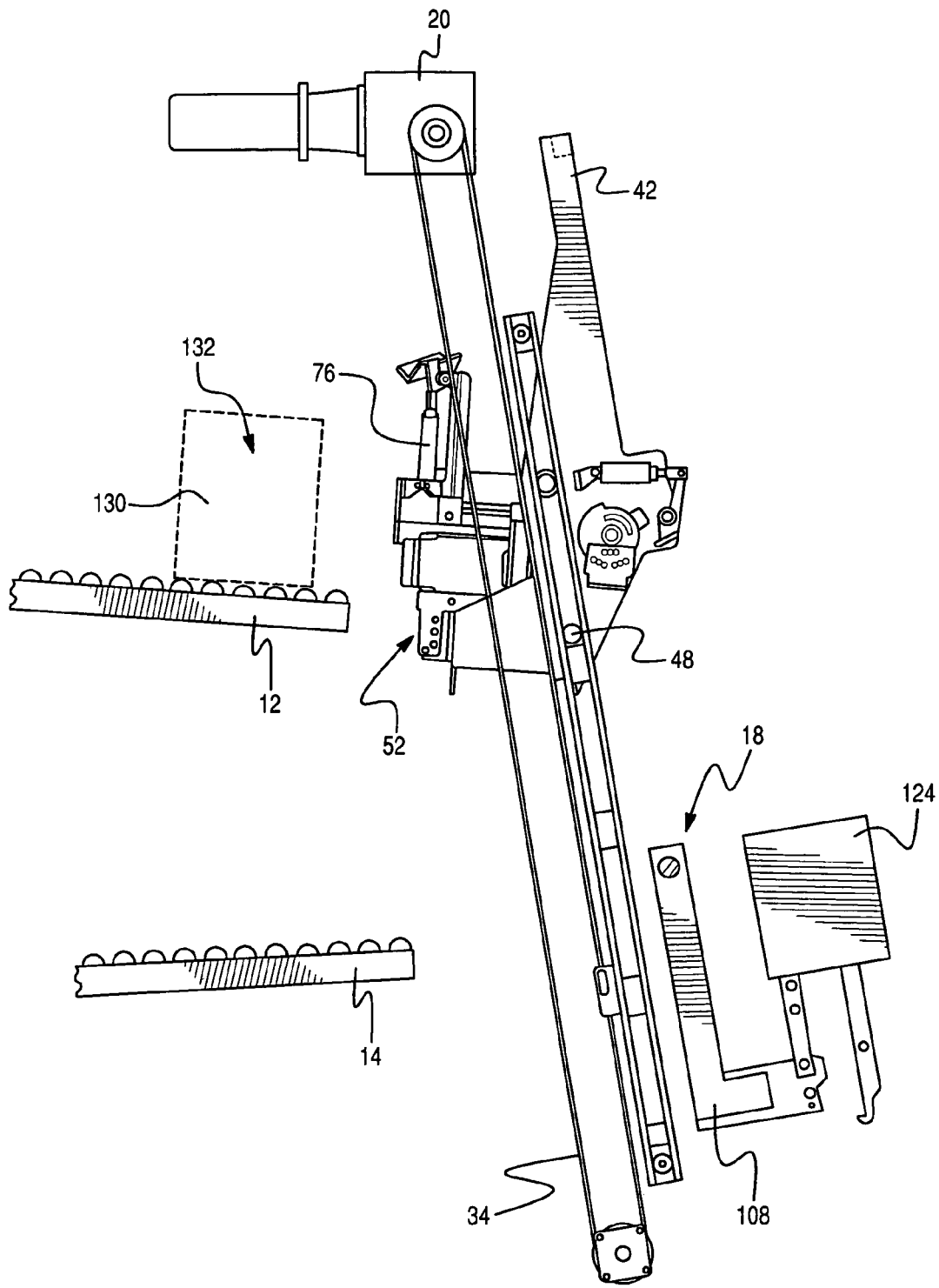
FIG. 7 is a side elevational view of the packing system of FIG. 1 in a first configuration with the lift positioned to receive an empty box from the feeding conveyor.
Figure 8:
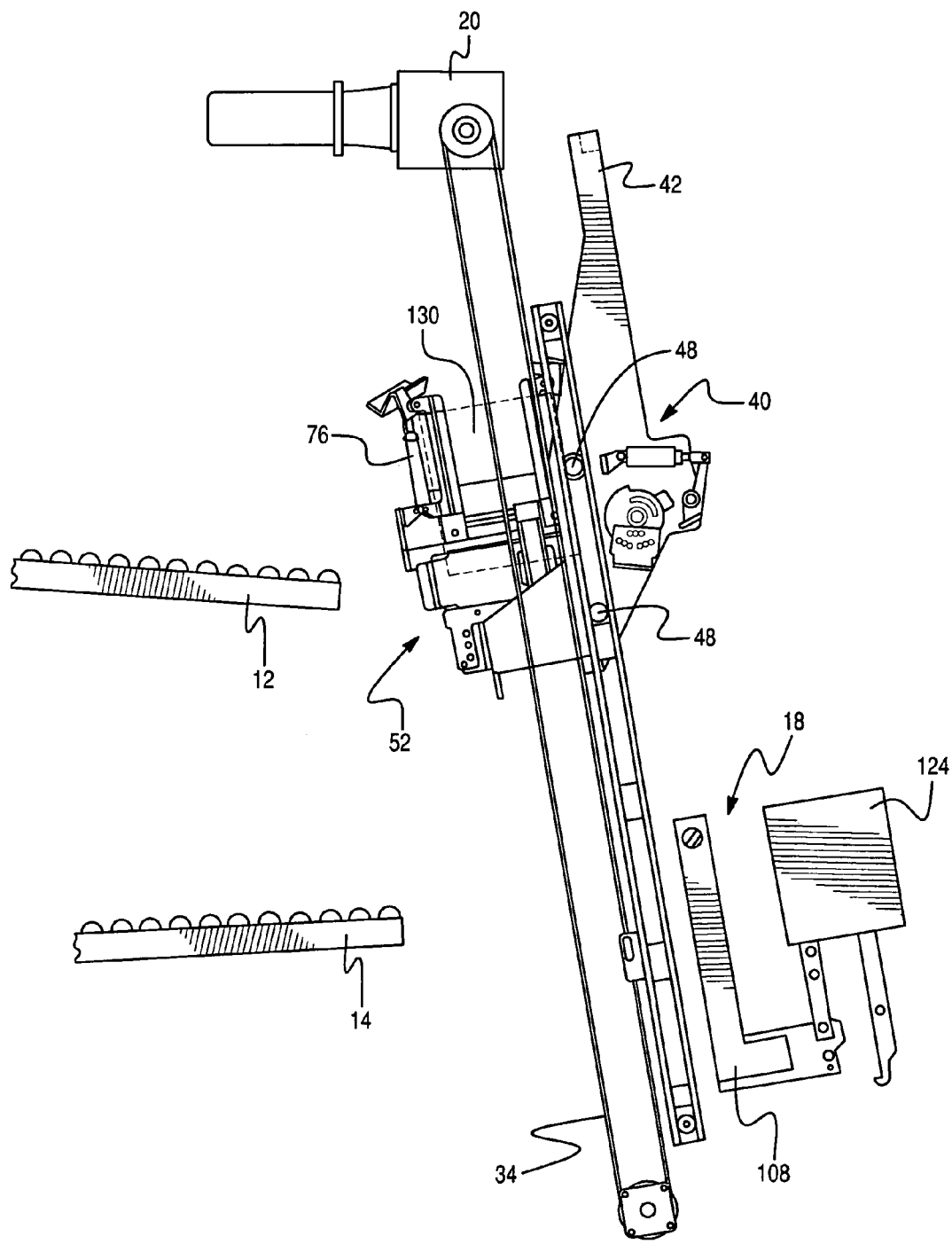
FIG. 8 is a side elevational view of the packing system of FIG. 1 in a second configuration with an empty box gripped on a platform of the lift apparatus.

Lift platform 40 includes a first sidewall 42, a second sidewall 43, a top support 44, and a bottom support 46 supported for rolling movement along the guide tracks 36 by wheels 48, as best shown in FIG. 7, and is clamped to belts 34 by clamps 50. Thus, motor 20 moves lift platform 40 between raised and lowered positions on guide tracks 36 by rotating shaft 22. Motor controller 51 controls the operation of motor 20, and thus the position of lift platform 40 with respect to the guide tracks 36 and the matrix former 18.

Lift platform 40, as best shown in FIG. 2, further includes a pivoting platform 52 mounted on lift platform 40 for pivoting movement with respect to platform 40. Platform 52 includes a base frame 54, including a projecting arm 56 and a sidewall 58. A first axle 60 extends from first sidewall 42 and connects to sidewall 58, while a second axle 62 extends from second sidewall 43 and connects to projecting arm 56. The axles 60 and 62 are coaxial. Under the influence of appropriate actuators, pivoting platform 52 may be pivoted between first and second positions with respect to lift platform 40.

Figure 5:
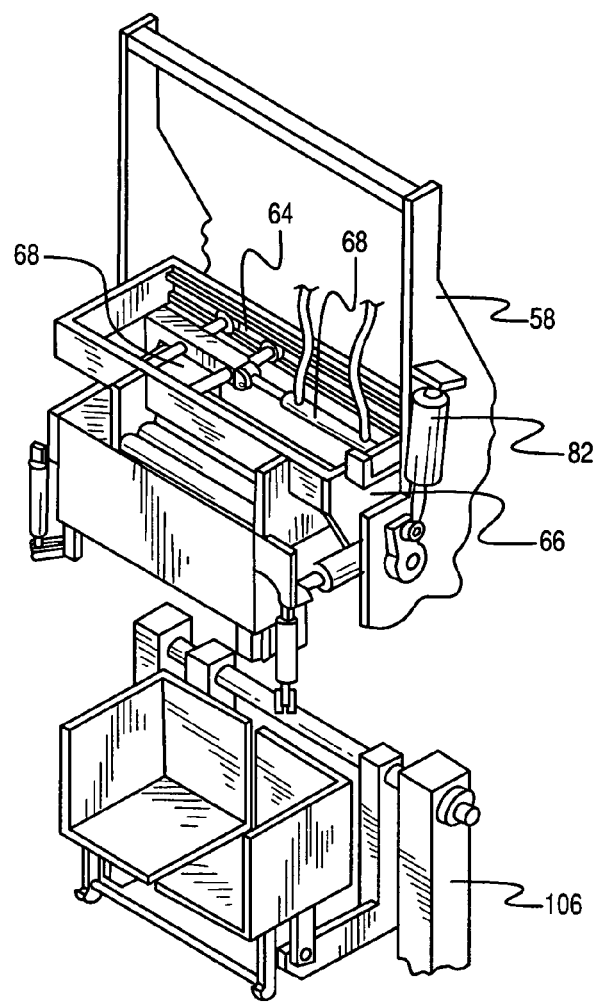
FIG. 5 is a fragmentary perspective view of the box holding portion of the lift apparatus in an inverted position.

Pivot platform 52 further includes a guide track 64, as best shown in FIG. 5, connected between sidewall 58 and sidewall 43, a first fixed wall 65 adjacent track 64 and a second wall 66 slidingly connected to track 64. An actuator 68, shown in FIG. 5, is mounted adjacent track 64, for moving sliding wall 66 toward and away from fixed wall 65 to grip a box placed therebetween. A roller support 70, comprising a plurality of free-spinning rollers, is mounted on base frame 54 between sidewalls 43 and 58. Four posts 72 extend from walls 65 and 66 which posts are mutually parallel and arranged generally in a square. The top of each post 72 includes a finger 74 pivotally attached thereto, and an actuator 76 connects each finger 74 to the top of sidewall 65 or sliding wall 66, so that the fingers 74 can be pivoted between first and second positions with respect to the sliding walls by the actuators 76 and function as grippers for gripping the top edge of a box.

A crank arm 80, as best shown in FIG. 1, is attached to the end of axle 60, and a first cylinder and piston assembly 82 extends between crank arm 80 and sidewall 42 of lift platform 40. A second cylinder and piston assembly 84 extends between pivot platform 52 and sidewall 42. Operation of the first and second cylinder and piston assemblies 82 and 84 moves pivot platform 52 between first and second positions.

Figure 3:
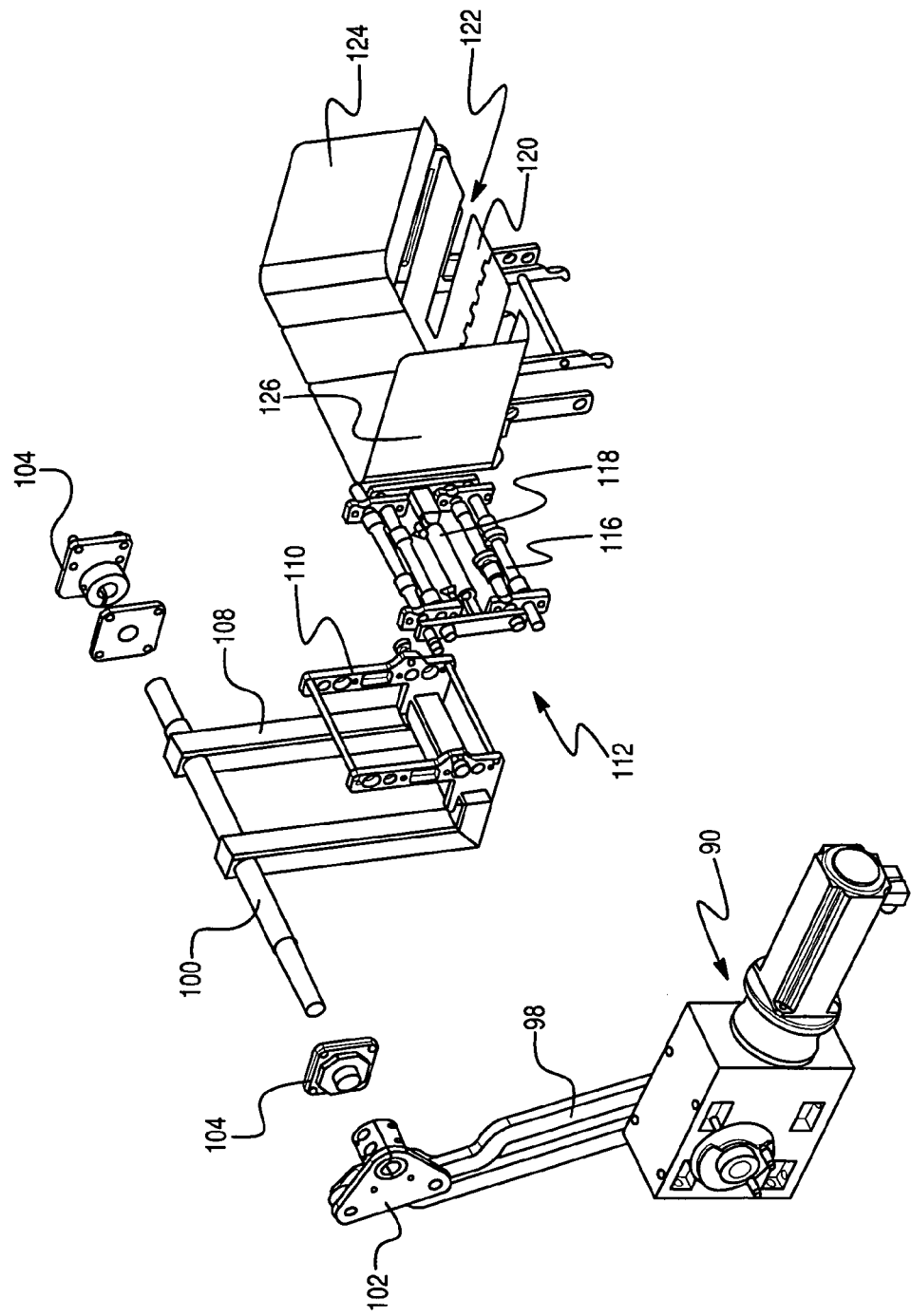
FIG. 3 is an exploded perspective view of matrix former of FIG. 1.
Figure 4:
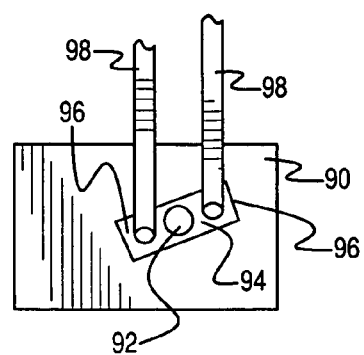
FIG. 4 is a rear elevational view of the motor of the matrix former of FIG. 1.
Figure 6:
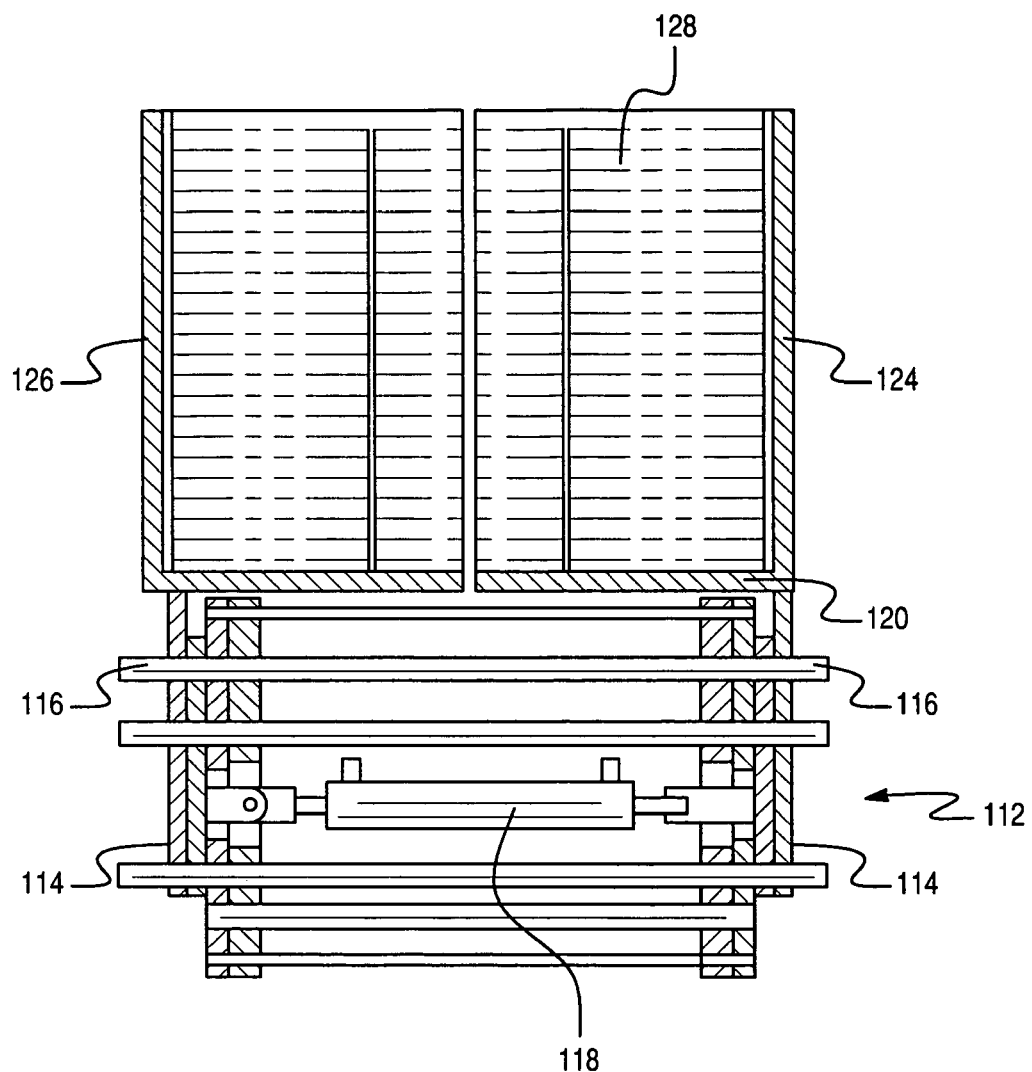
FIG. 6 is an elevational view of the matrix former of FIG. 1.

Referring now to FIGS. 3, 4 and 6, matrix former 18 can be seen to comprise a reversible motor 90 for rotating a drive shaft 92 approximately 180 degrees between first and second positions. Plate 94, having first and second ends 96, is supported on shaft 92, and first and second arms 98 are attached to the ends 96 of plate 94. Arms 98 are connected to a shaft 100 by a triangular plate member 102. One end of shaft 100 is connected to a first vertex of plate member 102, while arms 98 are connected to the other two vertices of the triangular plate member 102. Shaft 100 is securely supported by two bearing plates 104 fixedly mounted to a support structure 106, as best shown in FIG. 1. An L-shaped support 108 depends from shaft 100 and includes a projection 110 for supporting an actuating assembly 112. Actuating assembly 112 comprises side plates 114 connected by telescoping cylinders 116 and an actuator 118. The matrix former 18, as best shown in FIG. 3, further includes a patty-receiving platform 120 having three slots 122 therein, a first sidewall 124 connected to one of the side plate 114, and a second sidewall 126 connected to the other of the side plates 114. (The slots 122 are narrower than the width of the patties to be placed thereover.) The sidewalls 124 and 126 are movable toward and away from each other by operation of the actuating assembly 112 which is attached to the two side plates 114. FIG. 6 illustrates three stacks 128 of hamburger patties between the sidewalls 124, 126 of the matrix former 18 in a closely spaced relationship.

In operation, a first set of three stacks of hamburger patties is placed onto receiving platform 120, one stack over each of slots 122, by a stack placing device (not shown). A second set of three stacks is then placed on receiving platform 120 next to the first set of stacks by the stack placing device. The stacks are formed with a spacing between them, and are thus transferred to the receiving platform 120 with a spacing. To remove or substantially decrease this spacing, controller 51 operates actuator 118 to move side plates 114, and thus first and second sidewalls 124 and 126 which are connected to side plates 114, toward each other to slide the patties toward one another and form a tighter matrix of patties.

FIGS. 7 through 15 illustrate the interaction of the lift mechanism 16 and the matrix former 18 during one patty boxing operation. In FIG. 7, system 10 can be seen with an empty box 130, having an opening 132, that has been released to slide down box feed roller conveyor 12 toward and onto roller support 70 of lift platform 40. At this stage, matrix former 18 already holds six stacks (two rows of three stacks each) of hamburger patties. Once box 130 is received on roller platform 70, sliding side walls 66 are moved toward each other and toward box 130 by actuator 68, until they engage the sidewalls of the box and hold box 130 securely on platform 70. Actuators 76 pivot fingers 74 and move them into the opening 132 of box 130, where they further secure the box to the roller platform 70 and help hold down any flaps that the box might have. Platform 70 is then pivoted to the position shown in FIG. 8, with its surface generally normal to guide tracks 36. First cylinder and piston assembly 82, with a first end connected to first sidewall 42, presses against crank arm 80 on first axle 60, which causes pivoting platform 52 to pivot about the axes of first axle 60 and second axle 62 from the position shown in FIG. 8 to the position shown in FIG. 9 so that roller platform 70 is positioned over matrix former 18 and with the opening 132 of box 130 facing the stacks of patties on the matrix former. Sliding sidewalls 66 and fingers 74, held in place by actuators 76, keep box 130 secured with its bottom wall against roller platform 70.

Figure 10:
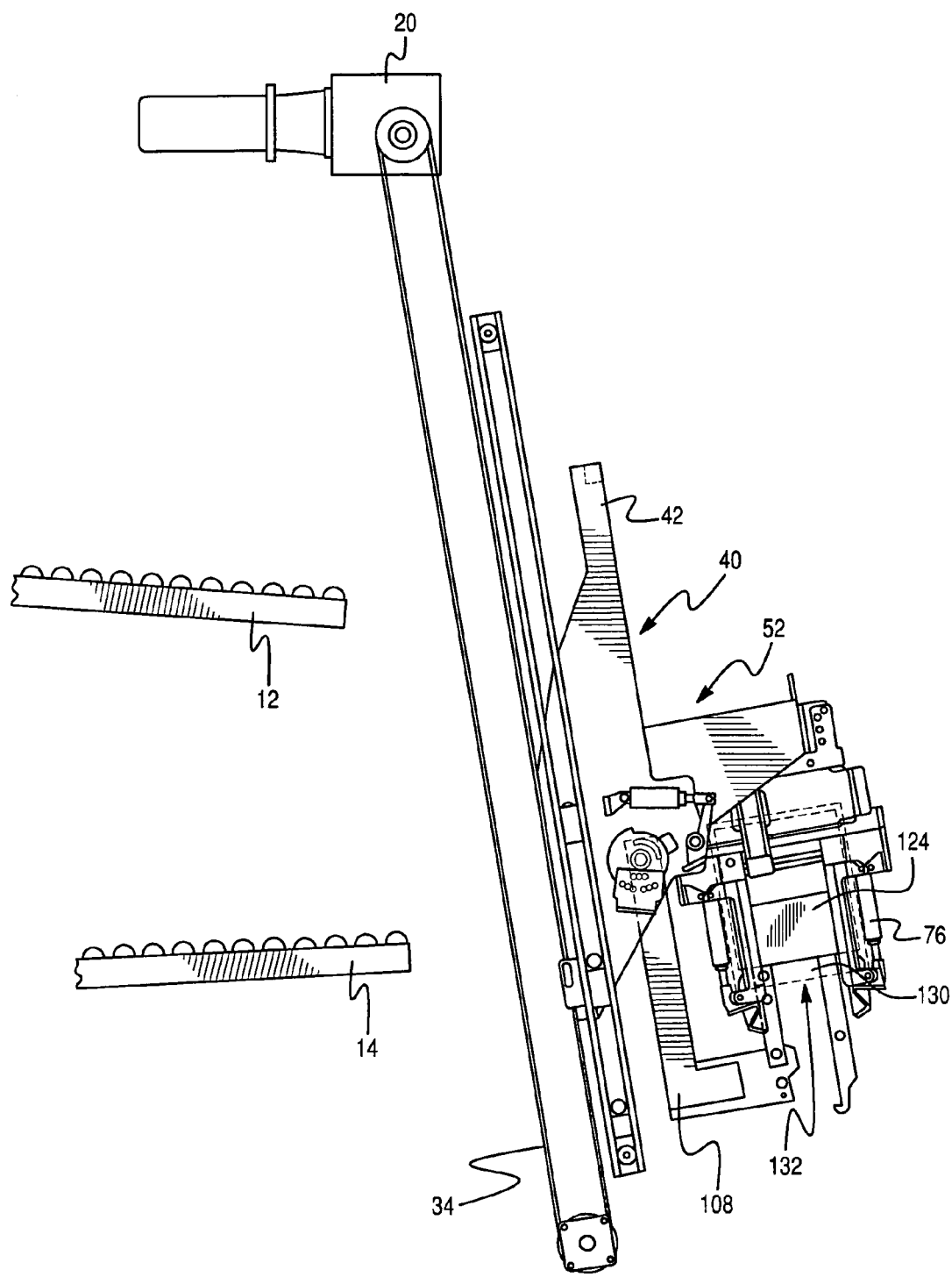
FIG. 10 is a side elevational view of the packing system of FIG. 1 in a fourth configuration with the platform held near the matrix former so that the matrix former is substantially covered by the box.
Figure 11:
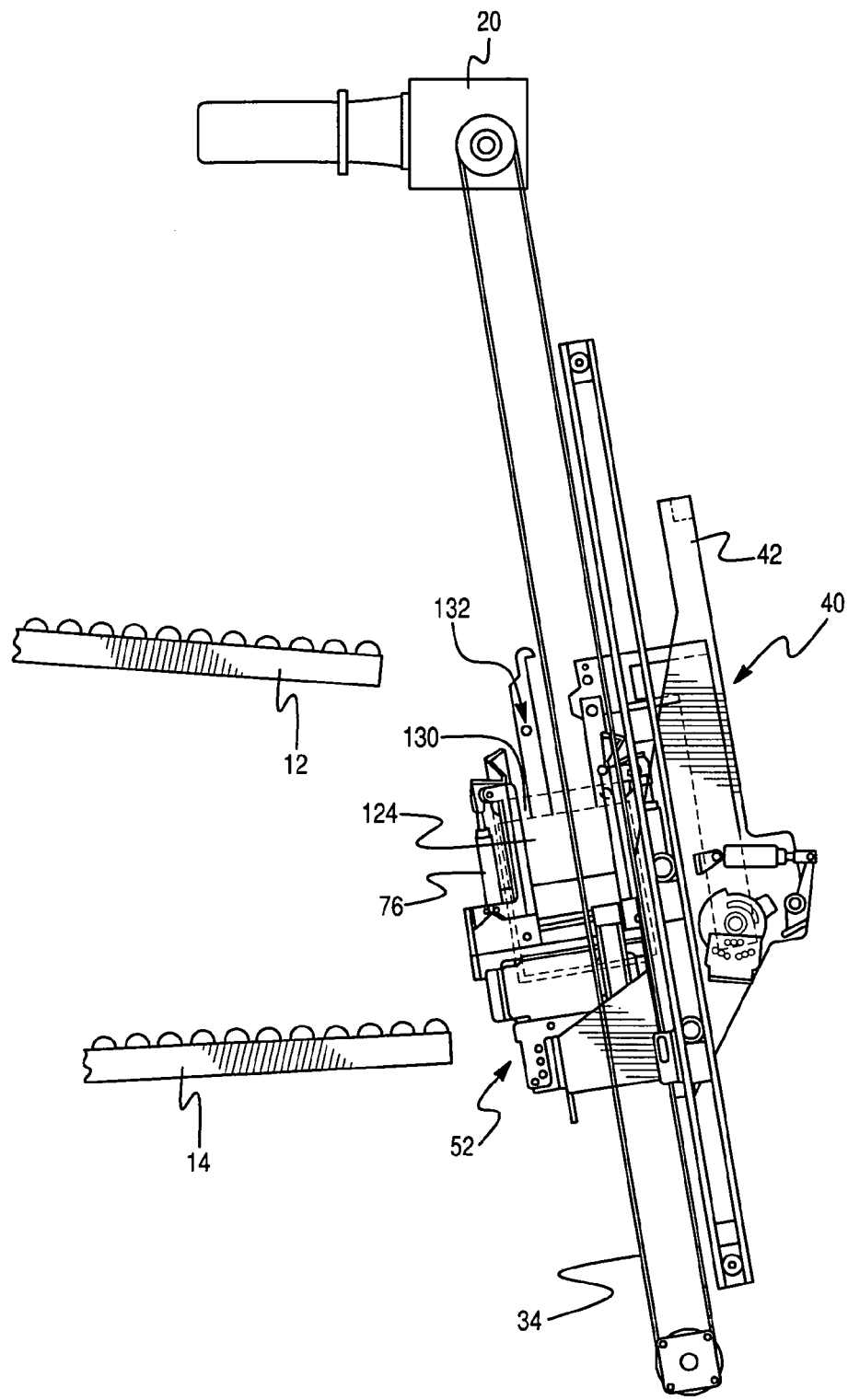
FIG. 11 is a side elevational view of the packing system of FIG. 1 in a fifth configuration with the platform and matrix former rotated 180 degrees from the position shown in FIG. 8.

Controller 51 next causes motor 20 to rotate shaft 22, in order to move belts 34 and thus platform 70 toward matrix former 18 until the sidewalls 124, 126 of the matrix former 18 and the patties on the matrix former surface 120 are inside box 130, as best shown in FIG. 10. In this position, shaft 100 of the matrix former is coaxially aligned with axles 60 and 62 of the lift platform.

Next, matrix former motor 90 actuates to rotate plate 94 and move one of the arms 98 toward shaft 100 and the other of arms 98 away from the shaft 100, thus rotating triangular plate 102 and shaft 100 connected thereto. This causes the receiving platform 120 to pivot about the axis of shaft 100. Simultaneously, first cylinder and piston assembly 82 and second cylinder and piston assembly 84 contract to pivot roller support platform 70 about axles 60 and 62, so that the box 130 on the roller support platform 70 and the patty support platform 120 of the matrix former remain essentially parallel as they rotate through 180 degrees to the position shown in FIG. 11. The patties, which had been supported by receiving platform 120 and covered by box 130, are in this new orientation supported by box 130 with the receiving platform 120 positioned thereover.

Figure 12:
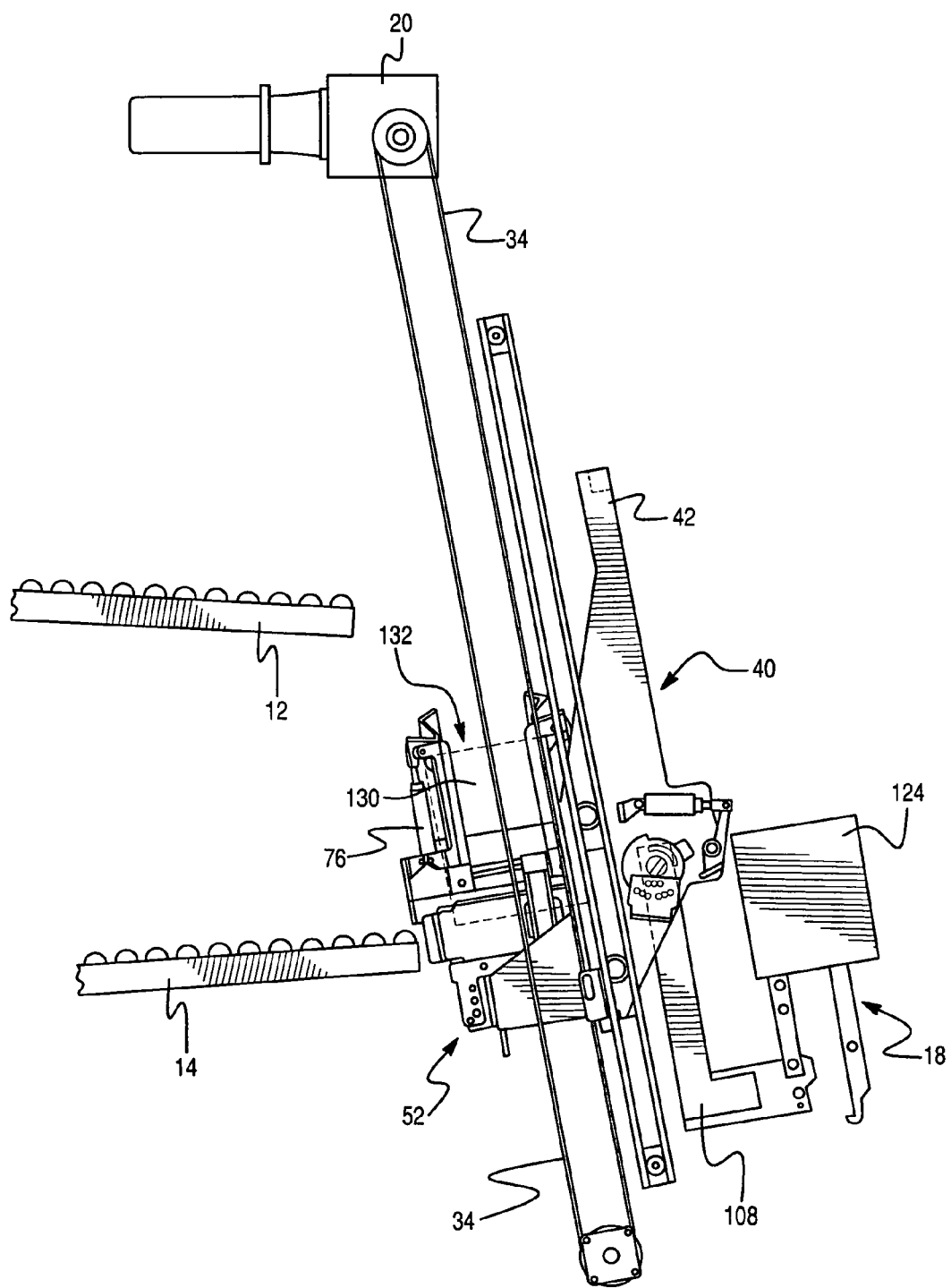
FIG. 12 is a side elevational view of the packing system of FIG. 1 in a sixth configuration with the platform moved away from the matrix former.
Figure 13:
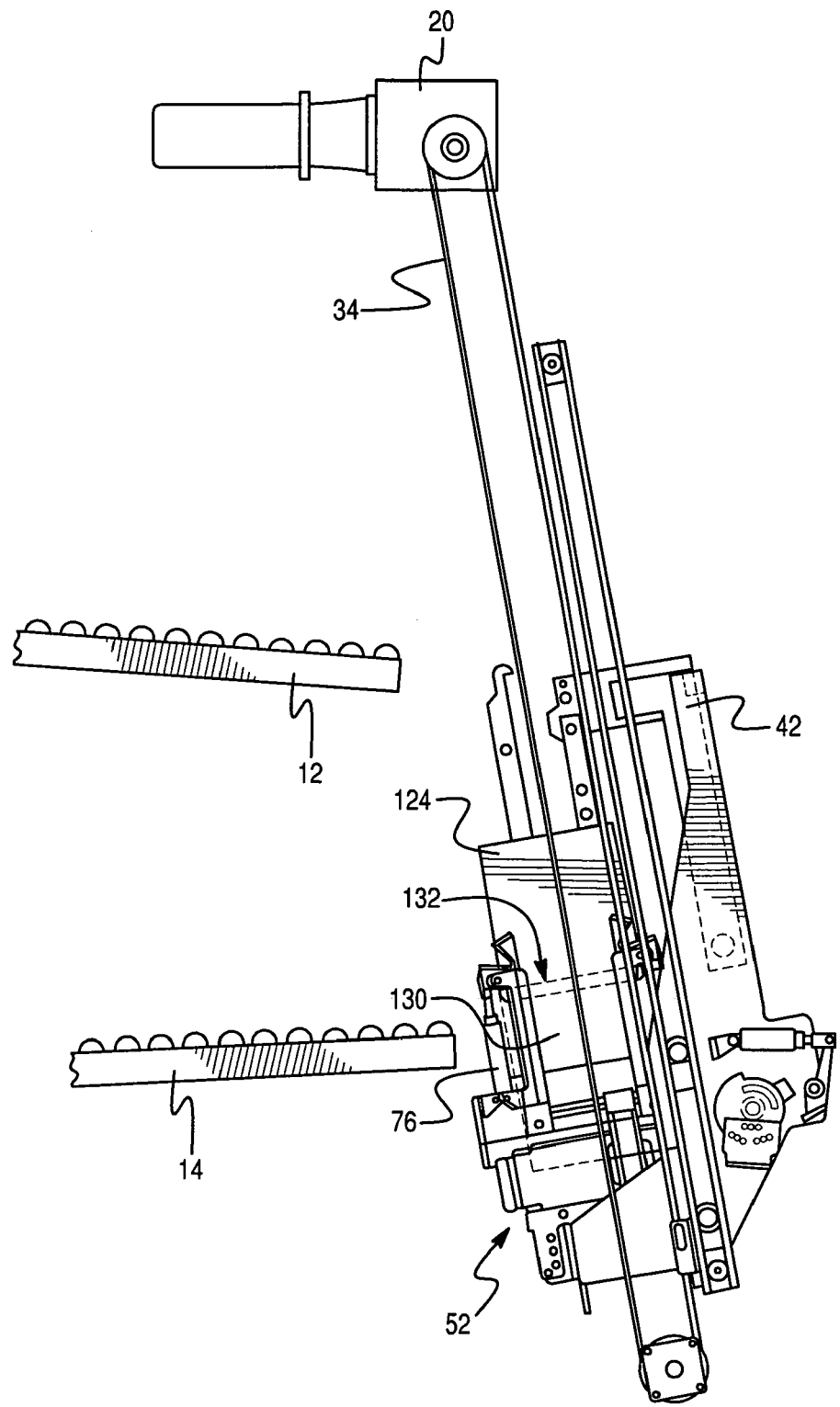
FIG. 13 is a side elevational view of the packing system of FIG. 1 in a seventh configuration showing the matrix former pivoted 180 degrees from the position shown in FIG. 10.
Figure 14:
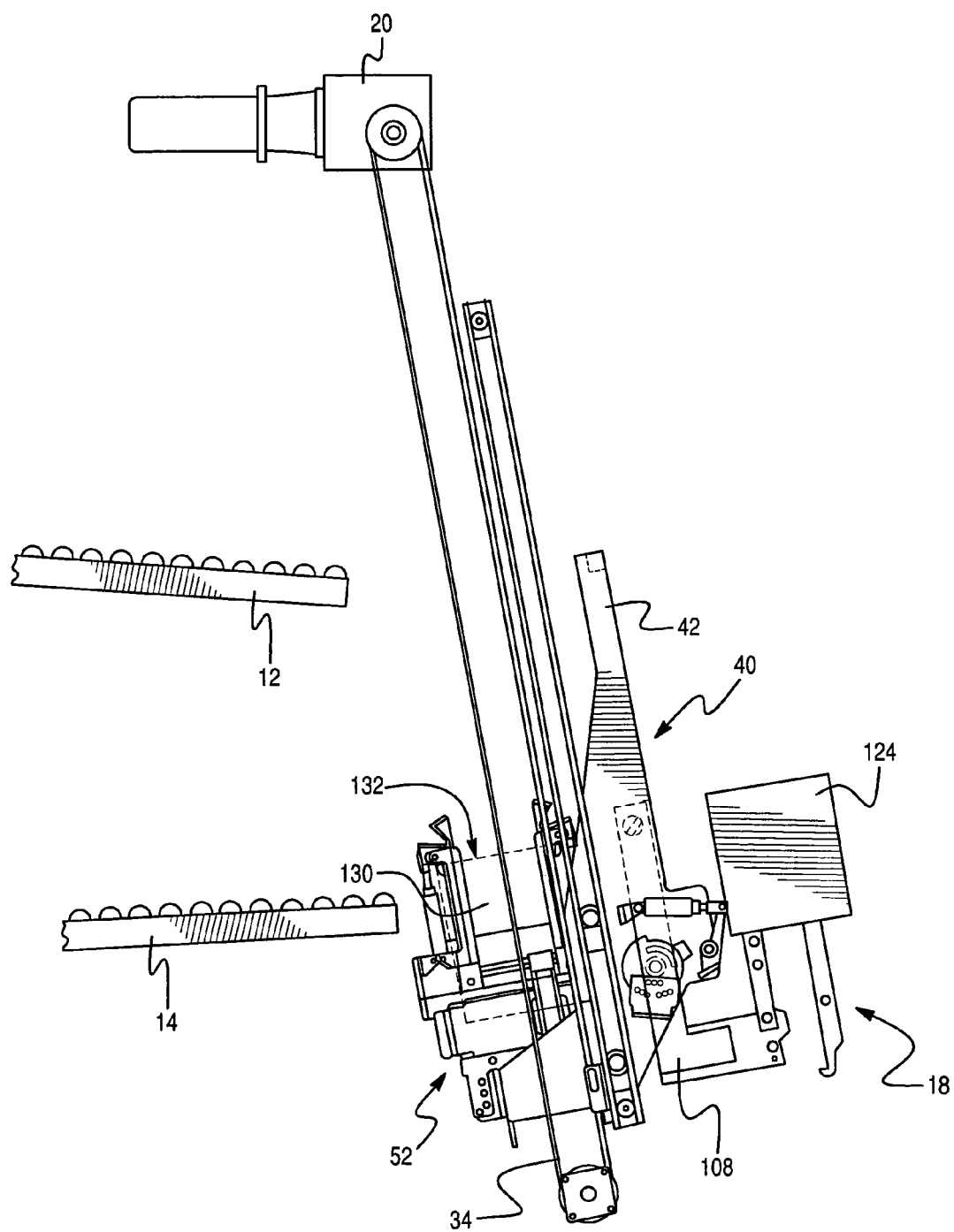
FIG. 14 is a side elevational view of the packing system of FIG. 1 in an eighth configuration with the platform and box raised to the level of the discharge conveyor.
Figure 15:
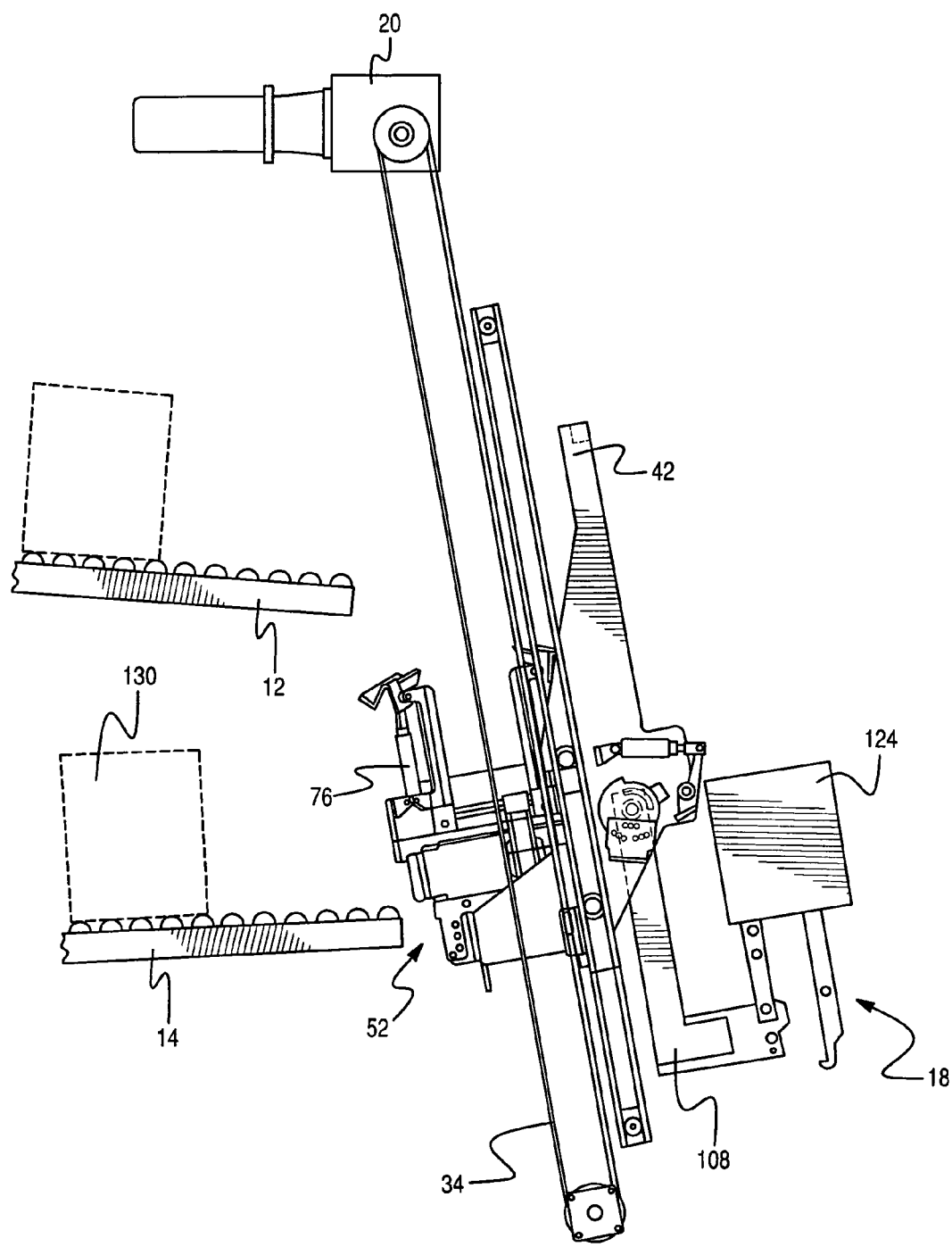
FIG. 15 is a side elevational view of the packing system of FIG. 1 in a ninth configuration showing a full box that has been released from the platform to the discharge conveyor and a new empty box in position on the feeding conveyor.

Motor 20 next rotates shaft 22 to move roller support platform 70 and box 130 thereon away from patty support platform 120 and away from shaft 22 until the patty support platform 120 is clear of the box 130, as best shown in FIG. 12. Motor 90 rotates shaft 100 to return the patty support platform 120 to its starting orientation as best shown in FIG. 13. Roller support platform 70 is next raised to the position shown in FIG. 14, generally parallel to the surface of discharge conveyor 14. Actuators 76 pivot fingers 74 out of top opening 132 of the box 130 and sliding sidewall 66 moves away from box 130. The box 130 may then slide under the force of gravity off roller platform 70 and onto the adjacent discharge conveyor 14 as best shown in FIG. 15. The lift platform 40 is then raised back toward the feed conveyor 12 to receive another box and start the cycle again.

Figure 9:
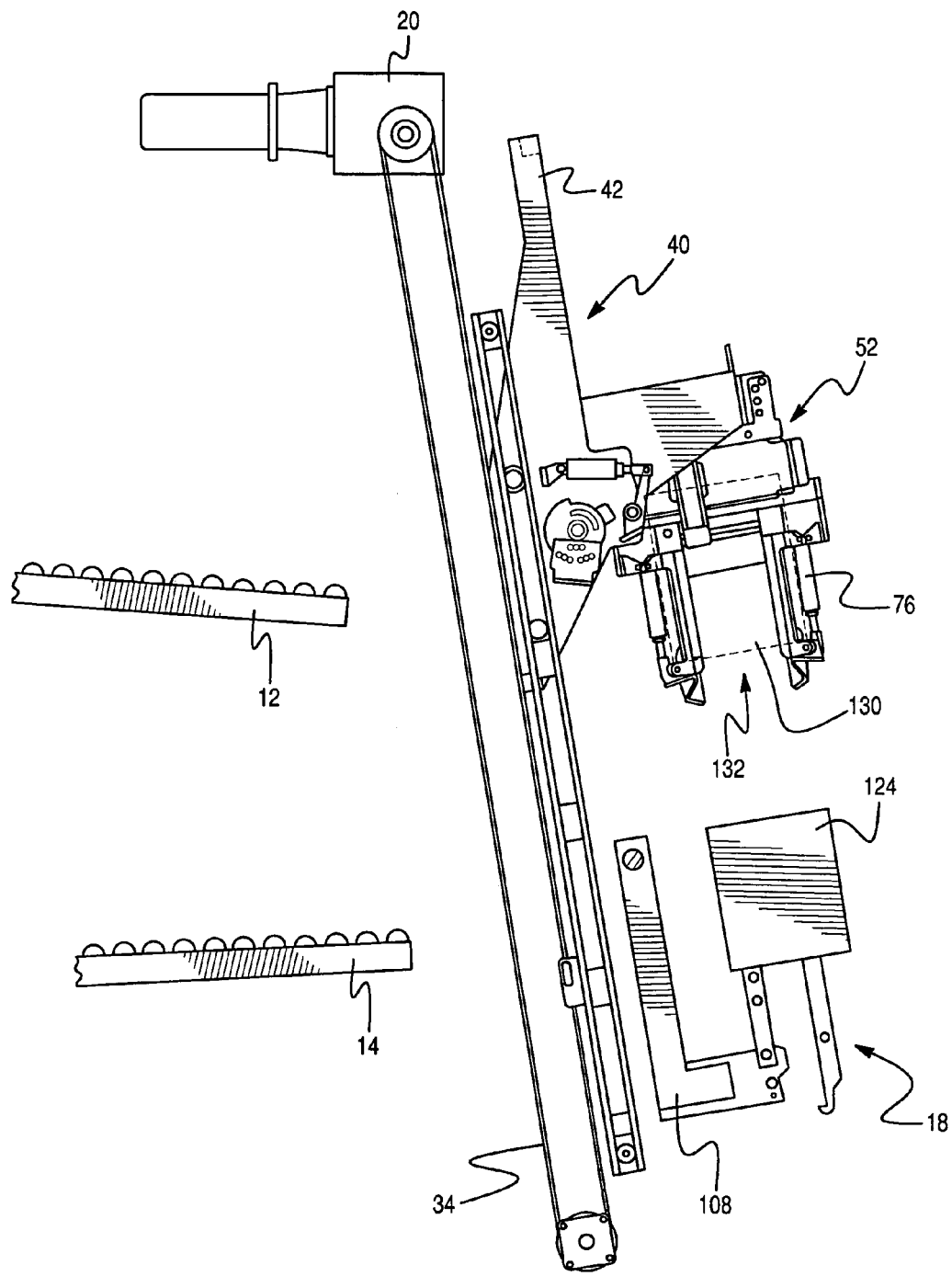
FIG. 9 is a side elevational view of the packing system of FIG. 1 in a third configuration with the platform and box positioned over the matrix former.
Figure 16:
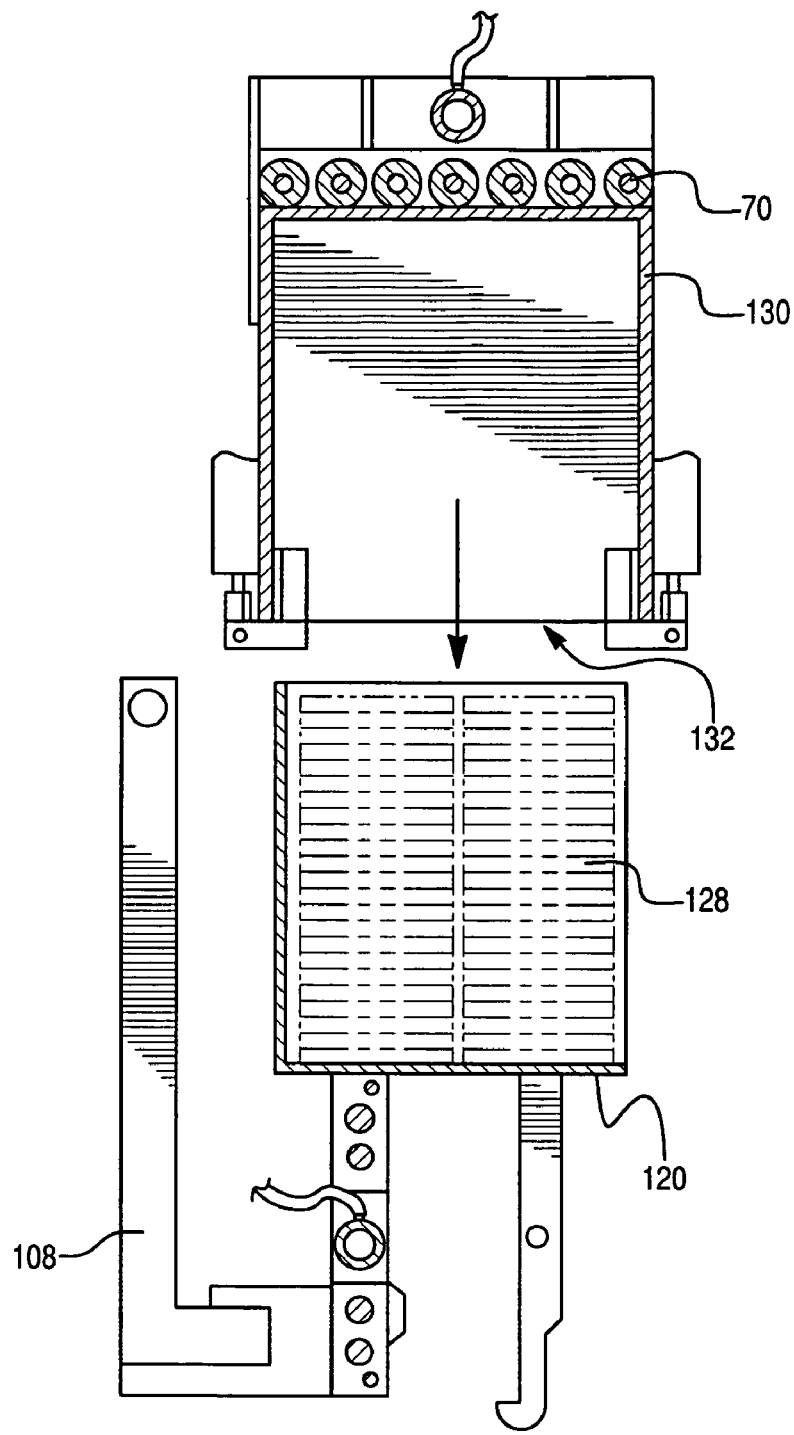
FIG. 16 is a side elevational view, partly in section, of the lift apparatus and the matrix former in a position similar to that shown in FIG. 8.
Figure 17:
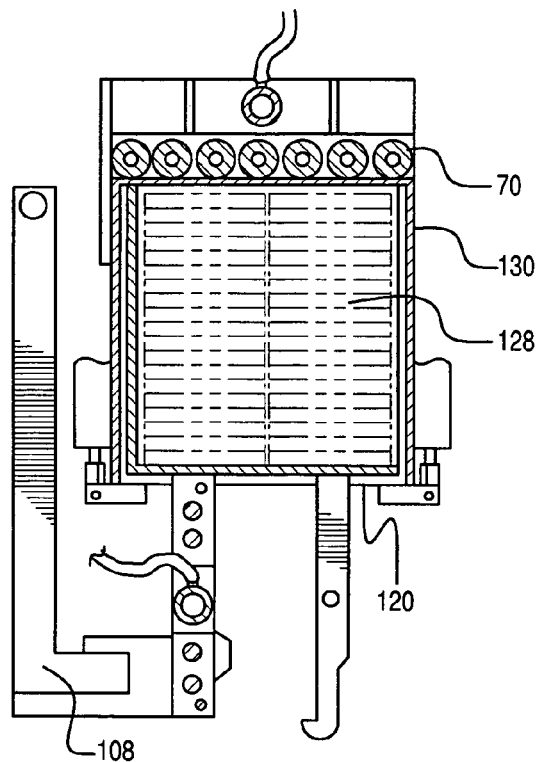
FIG. 17 is a side elevational view, partly in section, of the lift apparatus and the matrix former in a position similar to that shown in FIG. 9.
Figure 18:
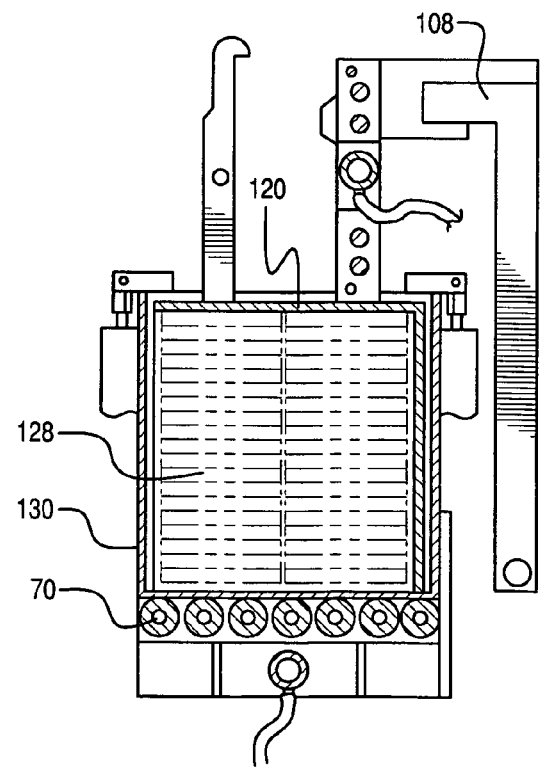
FIG. 18 is a side elevational view, partly in section, of the lift apparatus and the matrix former in a position similar to that shown in FIG. 10.
Figure 19:
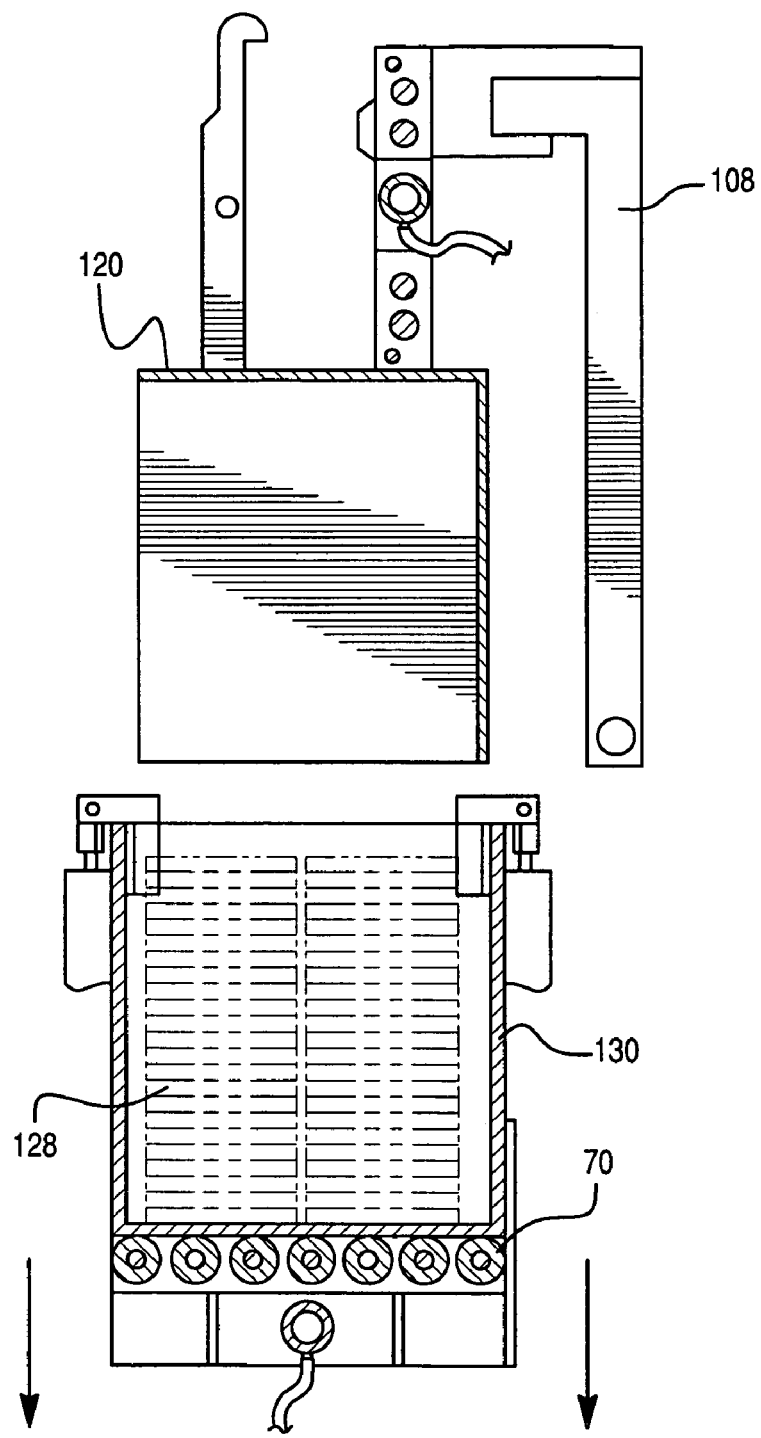
FIG. 19 is a side elevational view, partly in section, of the lift apparatus and the matrix former in a position similar to that shown in FIG. 11.

FIGS. 16–19 show in more detail the transfer of the stacks of patties 128 from the matrix former 18 to the box 130. FIG. 16 is a sectional view showing the inside of the box 130 and the matrix former 18 when the box 130 is held over the matrix former 18 as shown in FIG. 9. As can be seen in FIG. 17, the support platform 120 of the matrix former fits within the inside of box 130, with a small amount of clearance, and at about the level of opening 132. FIG. 18 shows the inside of box 130 when the matrix former 18 and lift platform 40 are positioned as in FIG. 11, so that the stacks 128 of patties are now resting on the bottom of box 130. FIG. 19 corresponds to the position of the matrix former 18 and lift platform 40 shown in FIG. 12.

Figure 20:
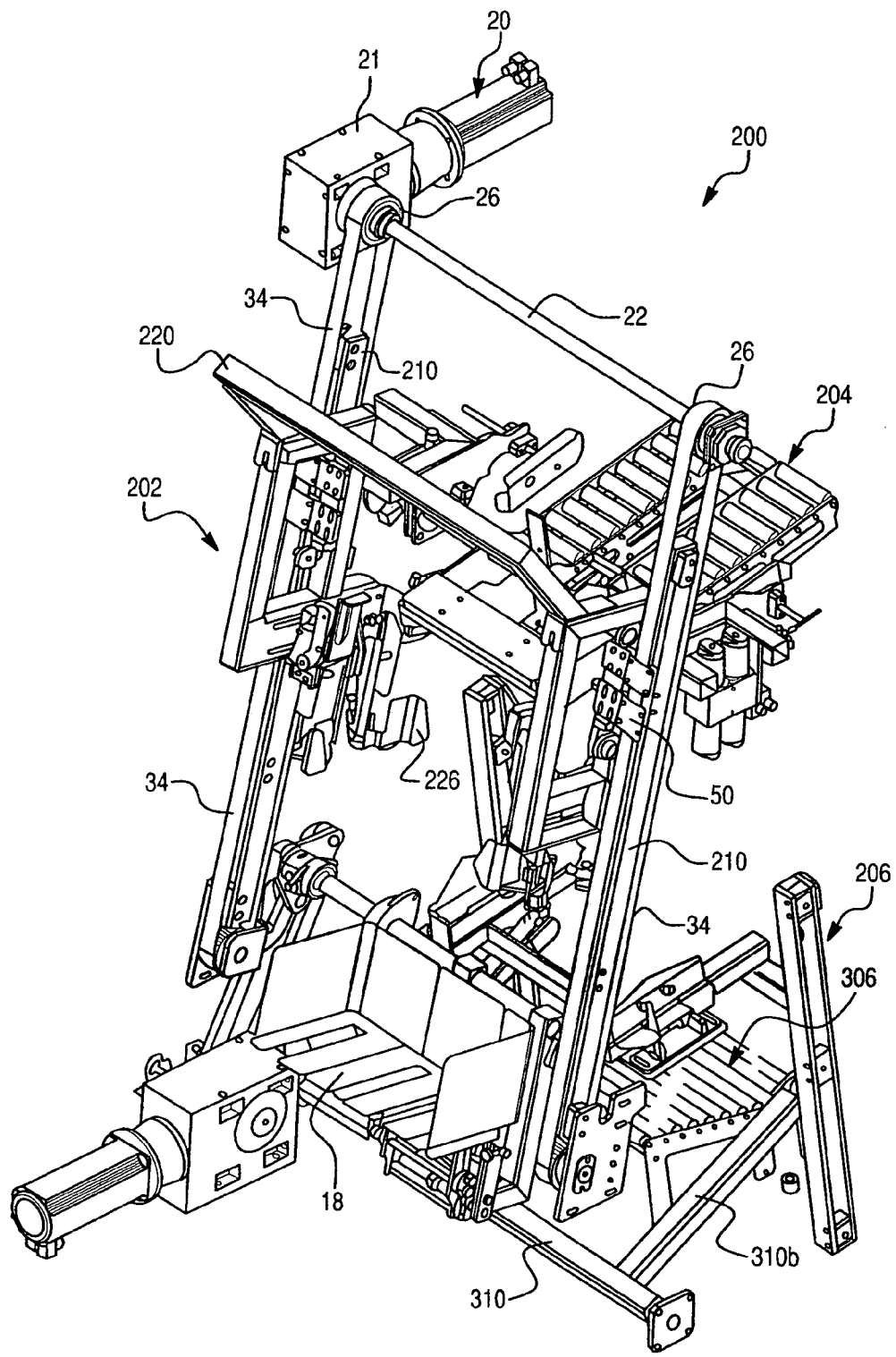
FIG. 20 is a perspective view of a packing apparatus according to a second embodiment.
Figure 21:
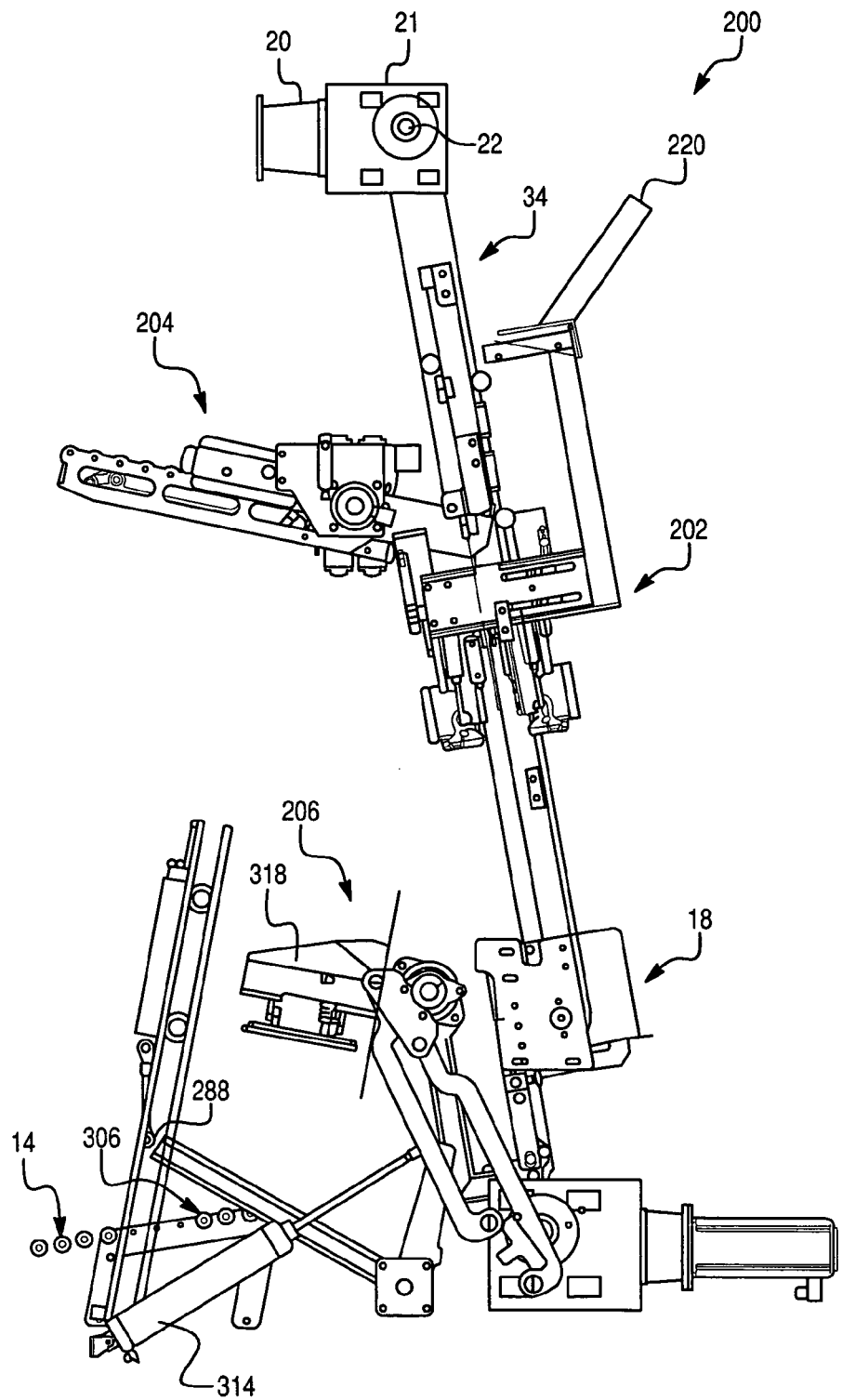
FIG. 21 is a side elevational view of the packing apparatus of the second embodiment.

A packing apparatus 200 according to a second embodiment is best shown in FIGS. 20 and 21. Some components of packing apparatus 200 are identical to components of packing apparatus 10, and are identified accordingly with like reference numerals. Packing apparatus 200 includes a matrix former 18, as described above, a lift assembly 202, a box rollover assembly 204, and a lowerator assembly 206.

Figure 22:
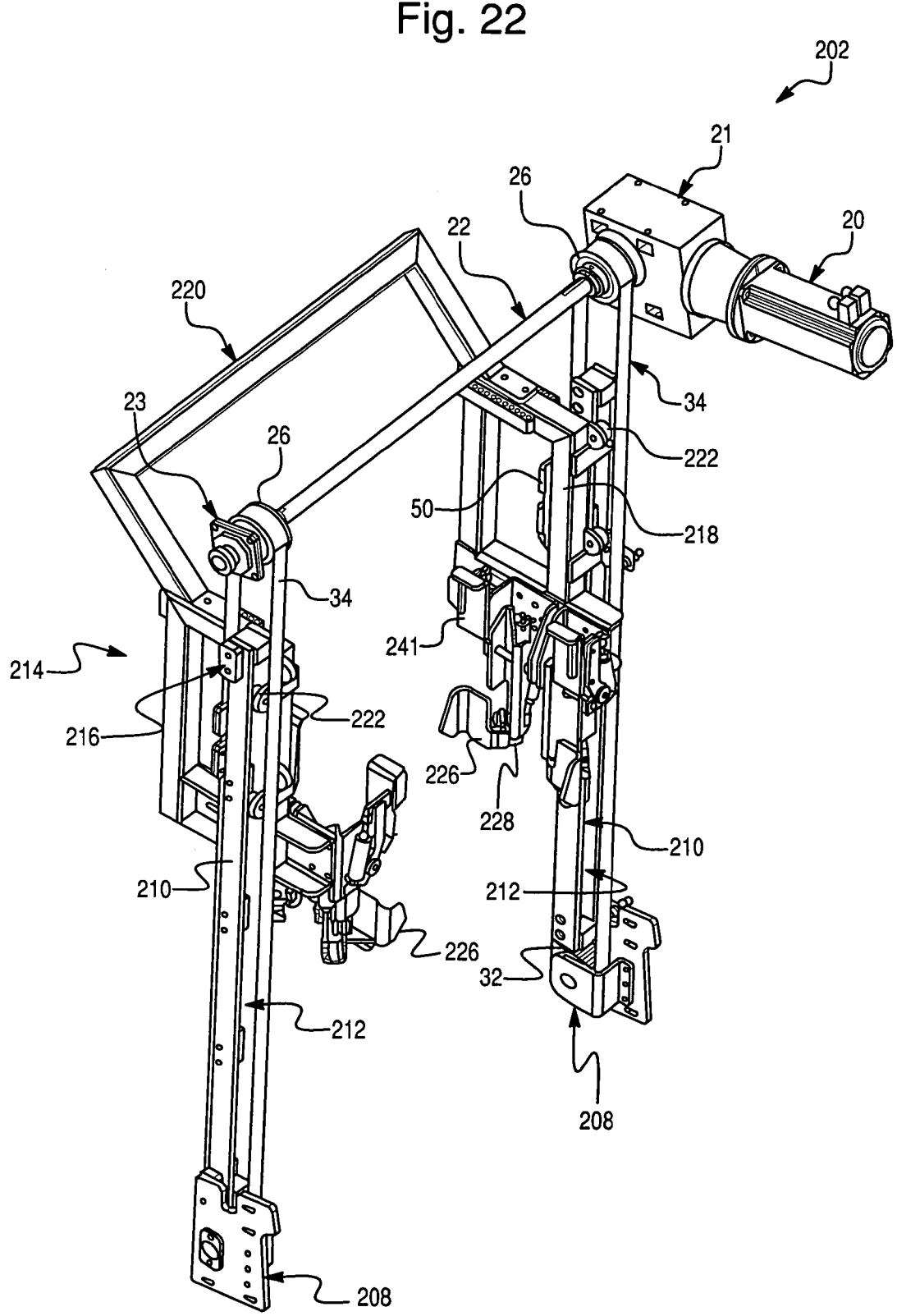
FIG. 22 is a perspective view of a lift assembly according to the second embodiment.
Figure 23:
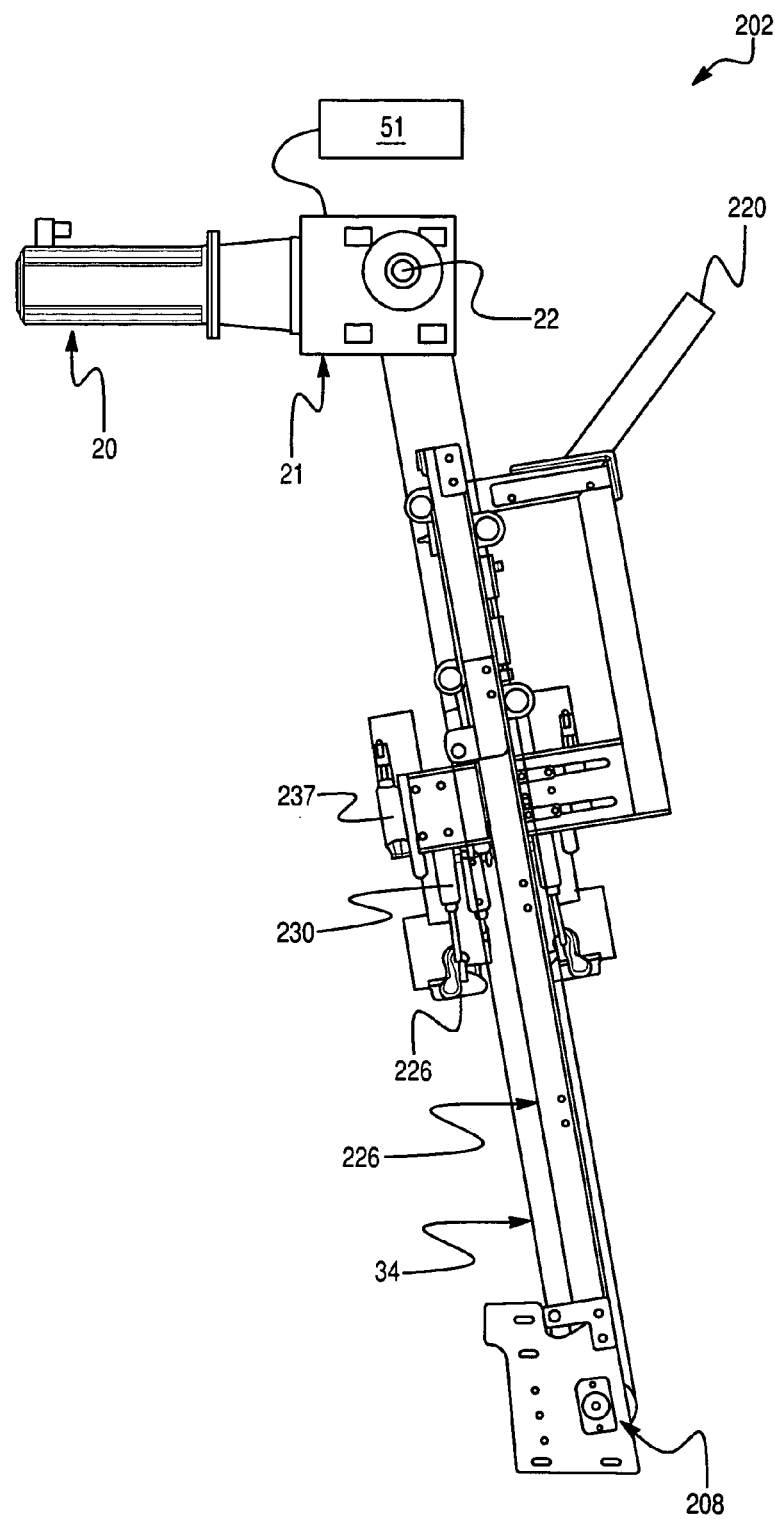
FIG. 23 is a side elevational view of the lift assembly of the second embodiment.

As best shown in FIGS. 22 and 23, lift assembly 202 includes reversible motor 20 and reducer 21 for turning drive shaft 22. Drive shaft 22 is supported on one end by reducer 21 (and/or motor 20) and on the other by a bearing bracket 23 mounted to a support (not shown). First and second flanged wheels 26 are mounted on shaft 22 for rotation therewith. First and second-idle wheels 32 are mounted on first and second support brackets 208, as shown in FIG. 22. First and second idle wheels 32 are spaced from and aligned with flanged wheels 26 on drive shaft 22. First and second belts 34 extend between aligned pairs of flanged wheels 26 and idle wheels 32, such that flanged wheels 26 and idle wheels 32 are rotated simultaneously when motor 20 turns drive shaft 22.

Figure 29:
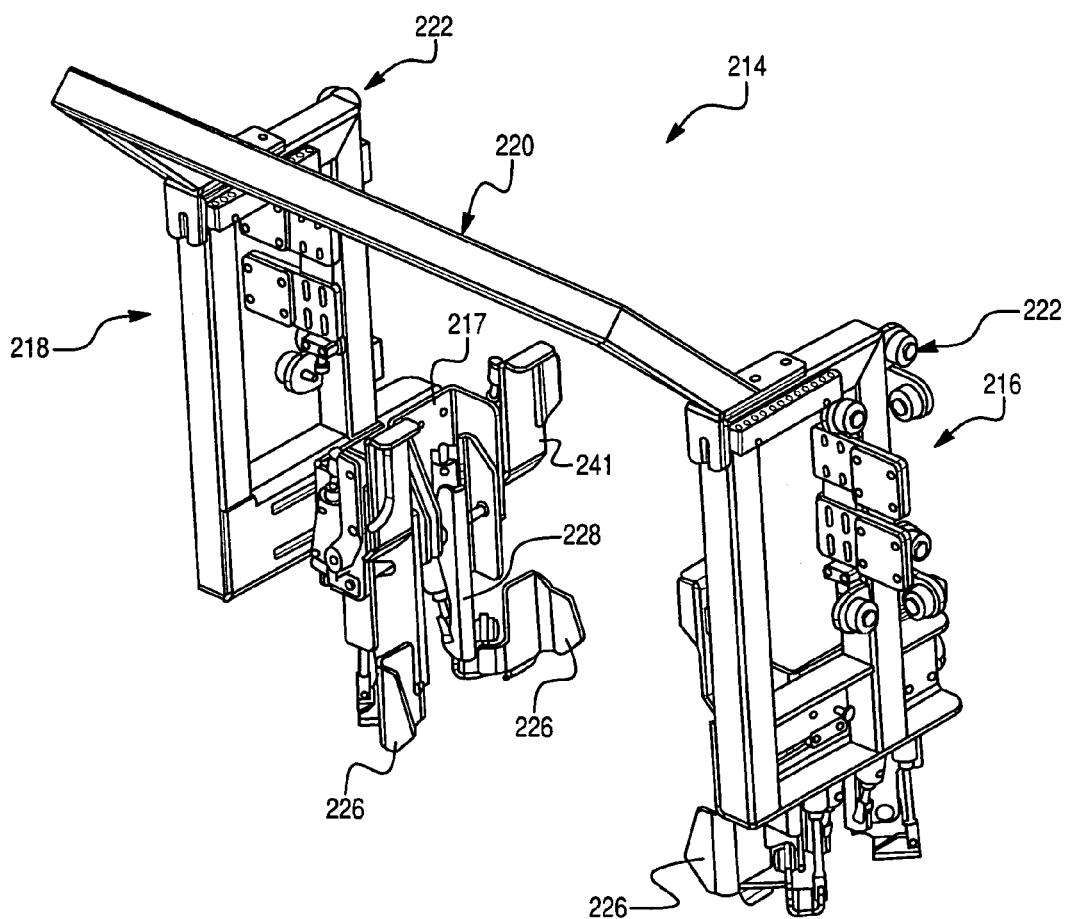
FIG. 29 is a perspective view of a lift cage according to the second embodiment.
Figure 30:
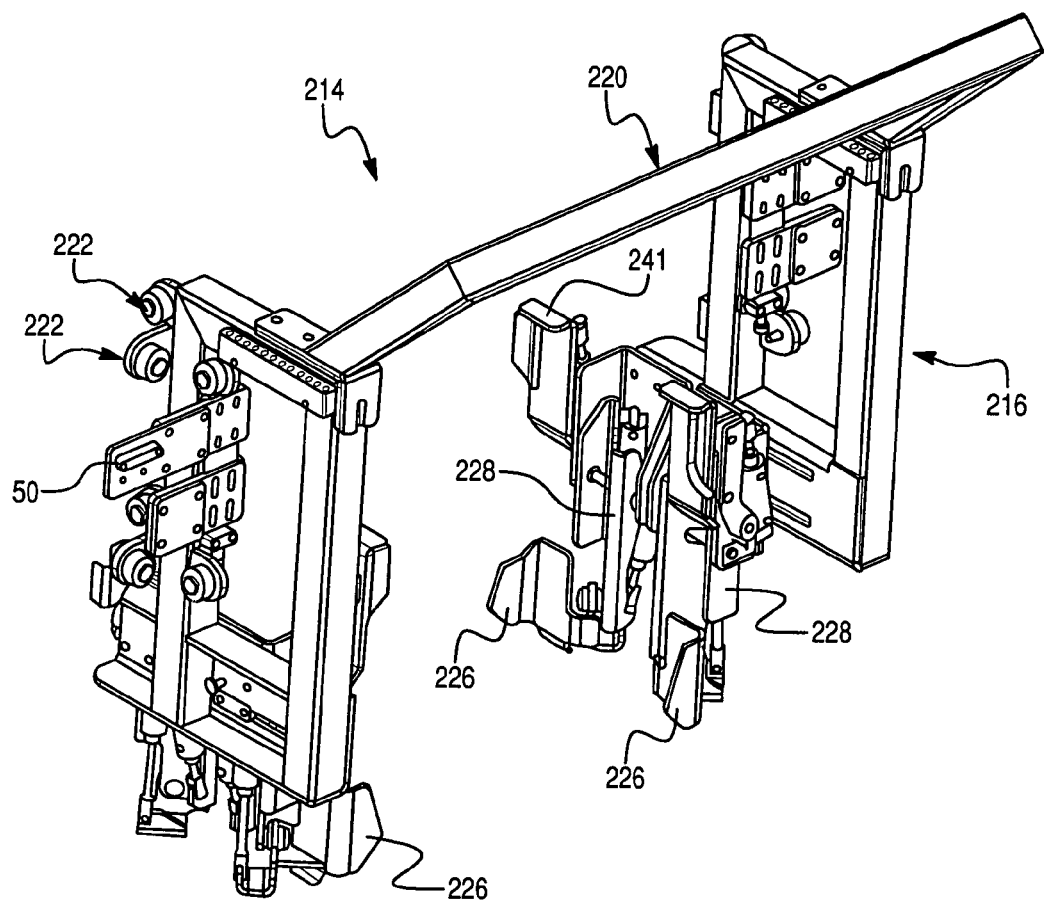
FIG. 30 is another perspective view of the lift cage of the second embodiment.

Parallel guide tracks 210 are mounted adjacent belts 34, and are similar to guide tracks 36 on packing apparatus 10. Each guide track 210 includes a channel 212. Lift assembly 202 includes a lift cage 214, as opposed to lift platform 40, as best shown in FIGS. 29 and 30. Lift cage 214 includes a first side support 216, a second side support 218, and a top support 220. First and second side supports 216, 218 include rollers 222 that engage channels 212, so that lift cage 214 slides along guide tracks 210, as best shown in FIG. 22. Lift cage 214 is clamped to belts 34 by clamps 50, as best shown in FIGS. 20 and 30. Motor 20 moves lift cage 214 along guide tracks 210 by rotating shaft 22, as in the first embodiment. Motor controller 51 may also be provided to control the operation of motor 20, and thus the position of lift cage 214 with respect to guide tracks 210 and matrix former 18.

Figure 32:
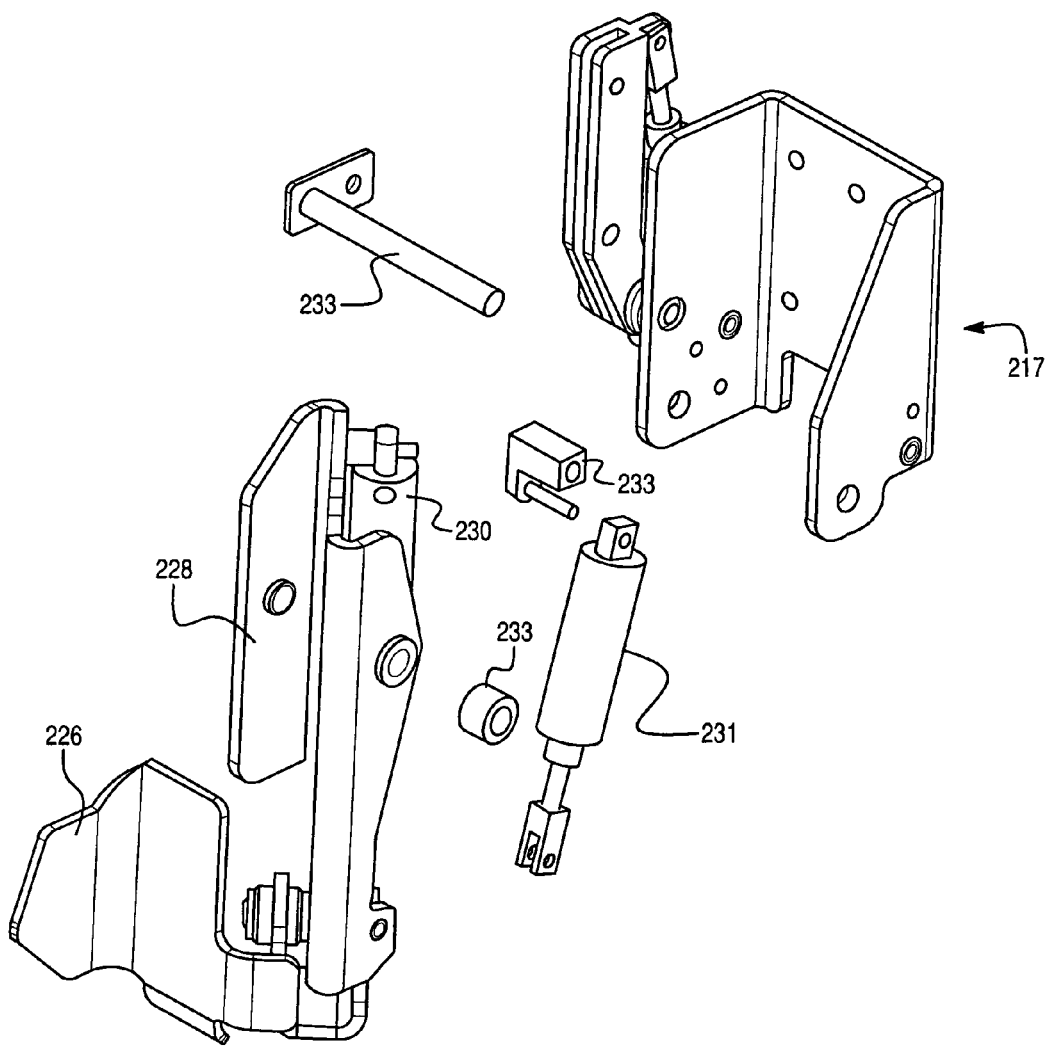
FIG. 32 is a perspective view of a moveable arm and associated actuator, pivoting finger and support plate of the side support.
Figure 33:
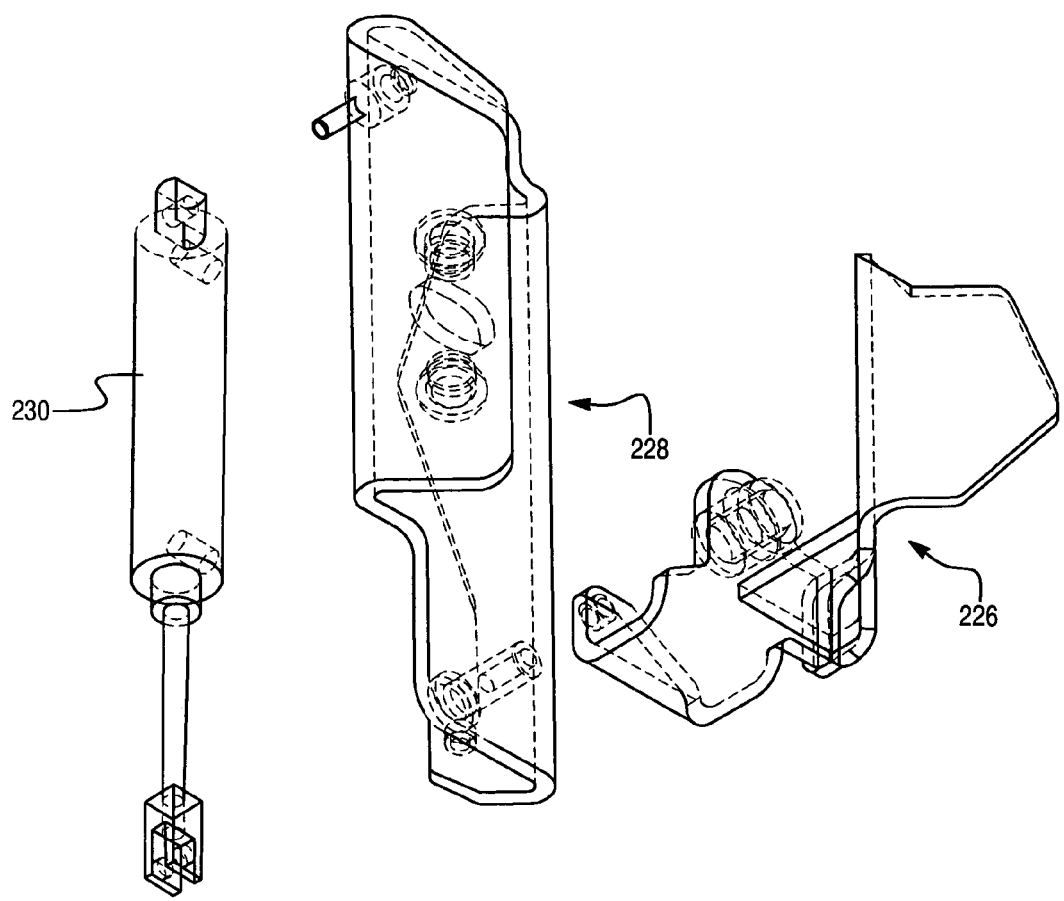
FIG. 33 is a perspective view of the moveable arm, pivoting finger and associated actuator with portions shown in phantom.

First and second side supports 216, 218 include fingers 226 pivotally attached thereto. Preferably, each side support 216, 218 includes two fingers 226, each finger 226 being mounted on a moveable arm 228, as best shown in FIGS. 29 and 30. Moveable arms 228 may be mutually parallel and arranged generally in a square. Each finger 226 may be pivoted via an operably associated actuator 230, as best shown in FIGS. 23 and 32–33. Actuator 230 is preferably a pneumatic cylinder. Each finger 226 is hingedly connected to arm 228. Actuator 230 causes finger 226 to move between first and second positions with respect to first and second side supports 216, 218 and maintain the top edge of a box open so that the box may be slide over matrix former 18.

Figure 31:
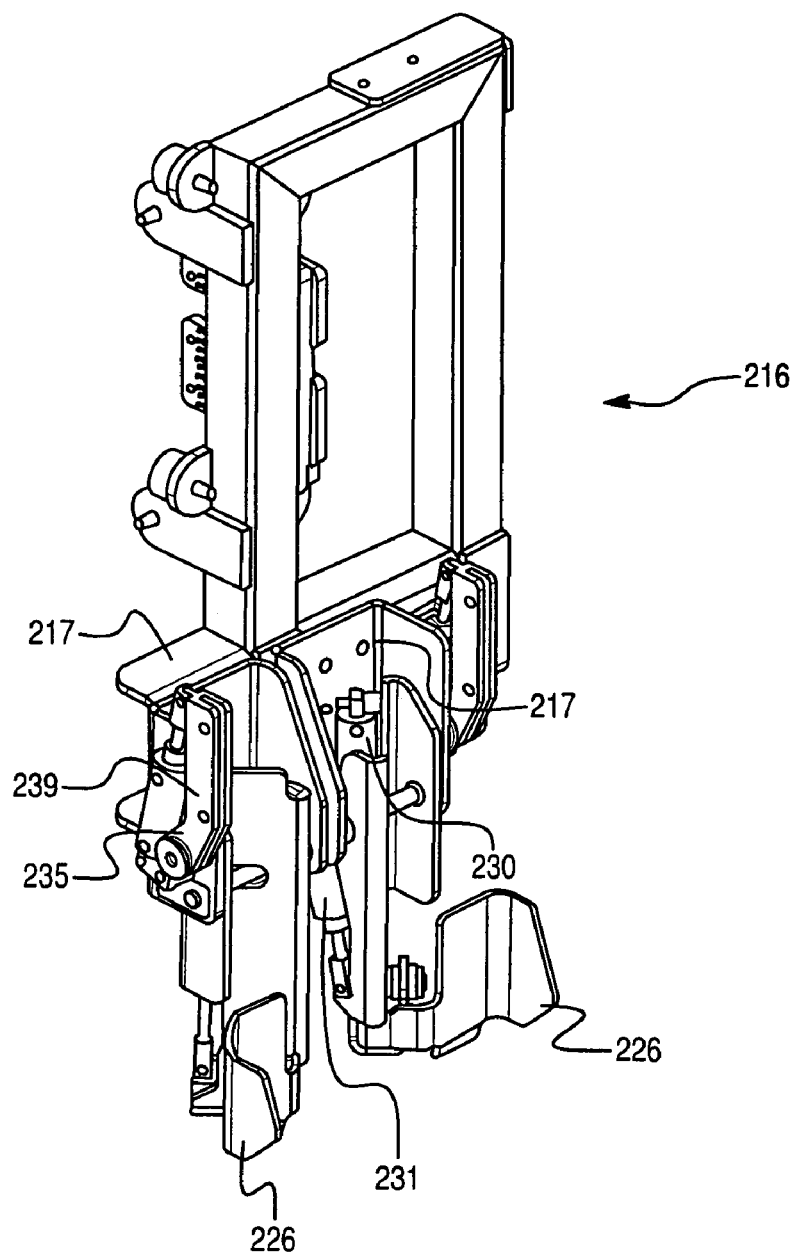
FIG. 31 is a perspective view of a side support of the lift cage.

Moveable arms 228 are secured to support plates 217, as best shown in FIG. 31. Moveable arms 228 may be moved inwardly and outwardly against and away from the sides of a box positioned therebetween via an operatively associated actuator 231, as best shown in FIGS. 31 and 32. Each actuator 231 is preferably a pneumatic cylinder, and is connected to on one end to arm 228, and on the opposite end to support plate 217. Actuator 231 causes arm 228, as well as the associated finger 226 attached thereto, to move either toward or away from the empty box. Actuator 231 is attached to support plate 217 via associated hardware 233, as best shown in FIG. 32.

Figure 34:
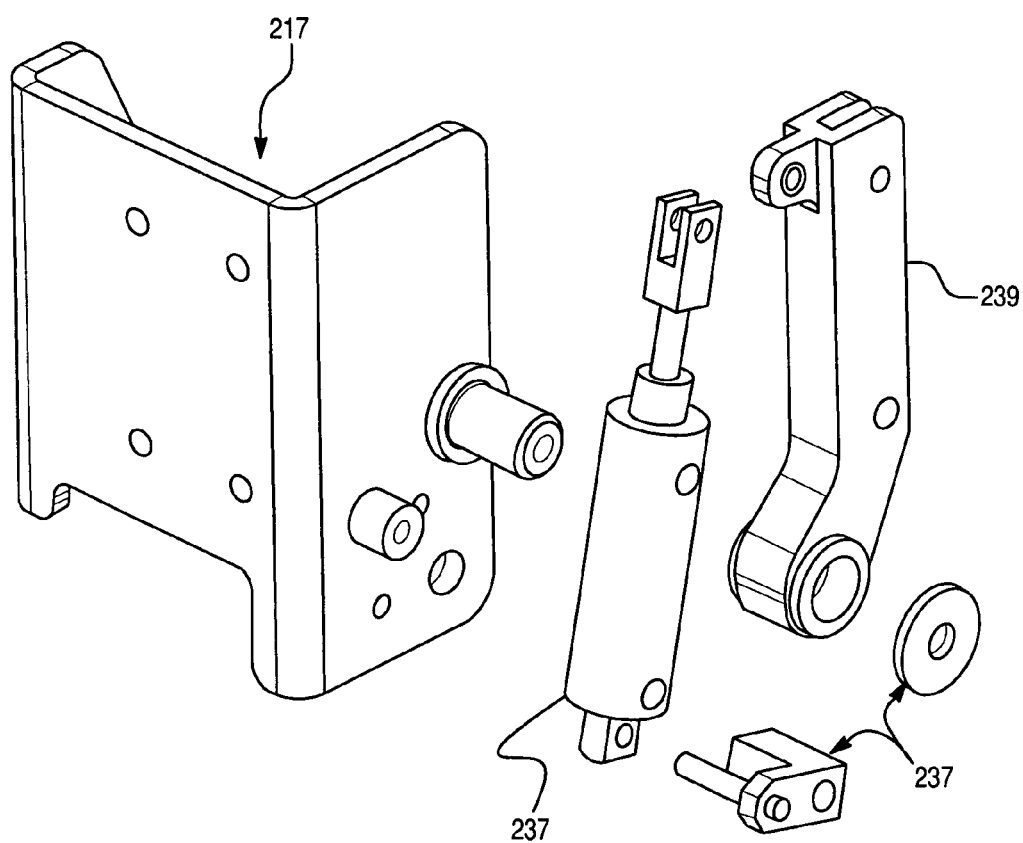
FIG. 34 is a perspective view of a support plate, connecting arm and associated actuator.

As best shown in FIGS. 31 and 34, one end of a connecting arm 239 is hingedly attached to support plate 217, and the opposite end of connecting arm 239 is attached to an operatively associated actuator 237 via associated hardware 237'. Actuator 237 causes connecting arm 239 to move inwardly or outwardly relative to an empty box positioned between moveable arms 228.

Figure 35:
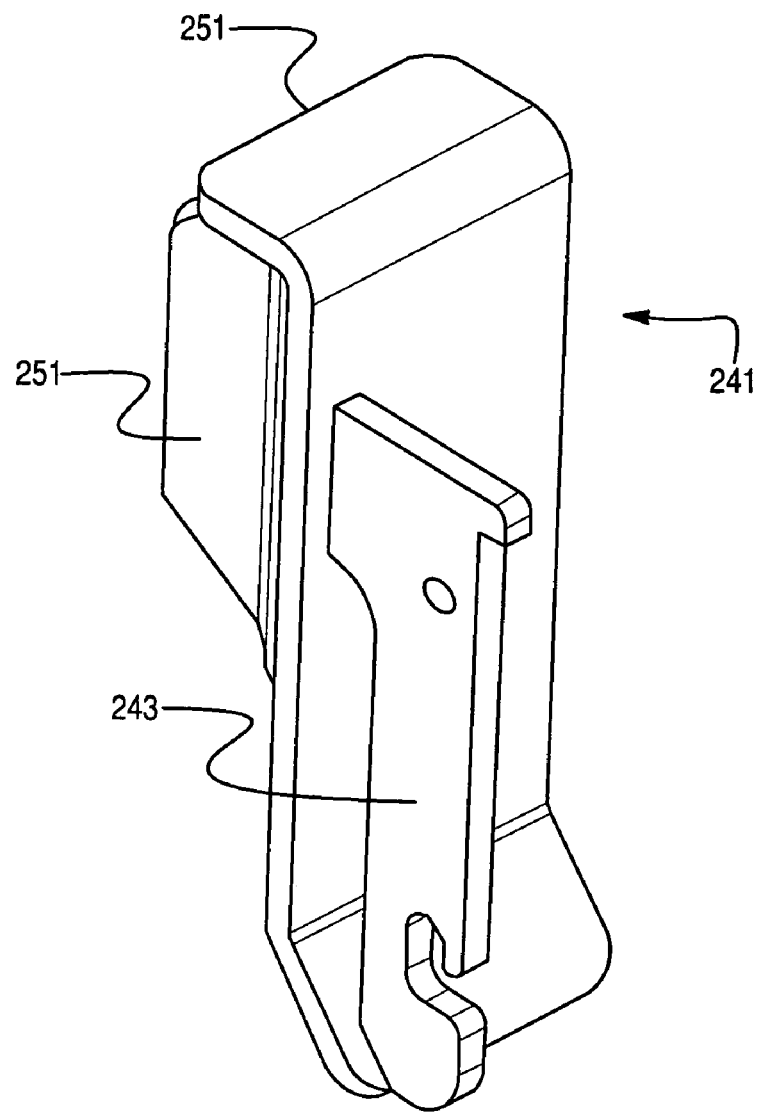
FIG. 35 is a perspective view of a moveable plate.

A moveable plate 241 may be secured to connecting arm 239, as best shown in FIGS. 29 and 30. As best shown in FIG. 35, moveable plate 241 may include a bracket 243, which engages connecting arm 239. Moveable plate 241 is thereby inwardly and outwardly moveable as connecting arm 239 moves. Moveable plate 241 may include positioning sides 251 for maintaining the empty box in the desired position. Preferably, bracket 243 is welded to plate 241, and sides 251 are either welded or bent, to form plate 241 as a single part. As best shown in FIGS. 29 and 30, four moveable plates 241 are positioned in a square configuration, and aligned with fingers 226, so that an empty box is received and held between moveable plates 241 and fingers 226.

When an empty box is received between moveable plates 241, actuator 237 causes connecting arm 239 to move inwardly. Thus, moveable plates 241 also move inwardly and against the sides of the box. Moveable arms 228 are also moved inwardly toward the box via actuator 231. Fingers 226 are then pivoted from the first position to the second position, which maintains the top edge of a box open so that the box may be slide over matrix former 18. In this way, the box is releaseably secured within lift cage 214.

Figure 24:
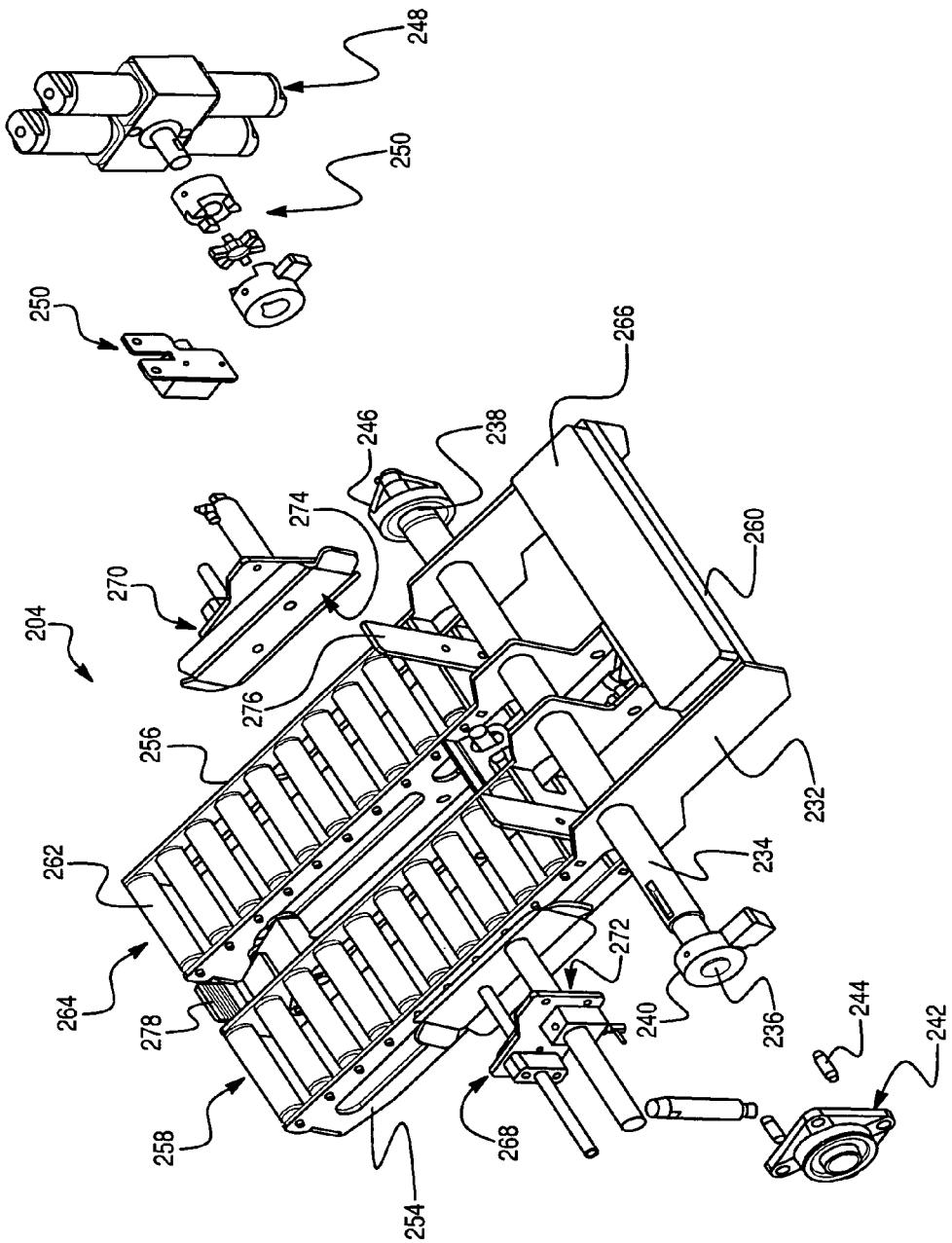
FIG. 24 is a perspective view of a rollover assembly according to the second embodiment.
Figure 25:
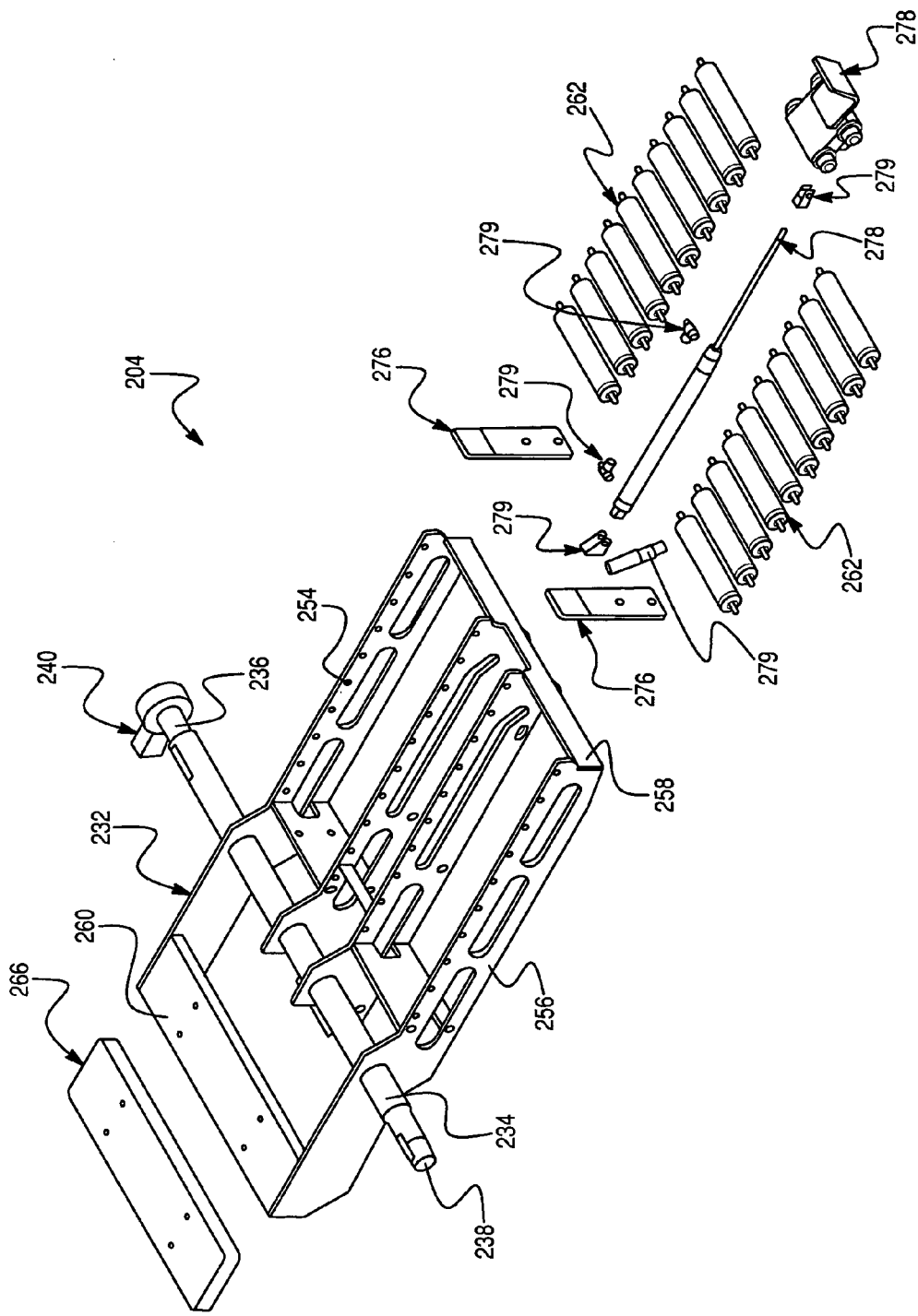
FIG. 25 is an exploded perspective view of the rollover assembly according to the second embodiment.

As best shown in FIGS. 24 and 25, box rollover assembly 204 includes a frame 232 pivotably mounted to a support shaft 234. Support shaft 234 includes first and second ends 236, 238, respectively. First end 236 includes a flag member 240, which may be connected to a bearing 242. Proximity sensors 244 may be connected to bracket 242 for sensing axial movement of flag member 240, and detecting when flag member 240 (and therefore support shaft 234) has rotated box rollover assembly 204 to either a load or unload position. Proximity sensors may then communicate the detected position of rollover assembly 204 to a controller, such as a computer, and/or to empty-box feeding conveyor. Bearing 242 may be mounted to a support structure (not shown). Stops (not shown) may be provided on the support structure, which limit axial movement of flag member 240, and thus restrict axial movement of support shaft 234.

Second end 238 includes a bearing and mounting bracket 246, which may be attached to an actuator 248 via associated mounting members 250 for reversibly rotating support shaft 234 and thus pivoting frame 232. Support shaft 234 is rotated about 160° in a first direction, until flag member 240 contacts one of pins 244. Support shaft 234 may also be rotated in a second direction opposite the first direction, until flag member 240 contacts the other pin 244.

Frame 232 includes spaced sides 254, 256 and first and second ends 258, 260. A plurality of free-spinning rollers 262 are mounted on frame 232 between sides 254, 256, and parallel to support shaft 234, forming a pivoting platform 264 extending from support shaft 234 to first end 258, as best shown in FIG. 24. A counter weight 266 may be secured to frame 232, adjacent second end 260, to offset the weight of pivoting platform 264.

A first side stop 268 may be mounted on first side 254 of frame 232. A second side stop 270 is mounted to a support (not shown) adjacent to second side 256 when pivoting platform 264 is in the first position for receiving a box from empty box-feeding conveyor 12. Alternatively, second side stop 270 may be mounted to second side 256. First and second side stops 268, 270 include box positioning surfaces 272, 274, respectively, for guiding and maintaining an empty box in the desired position on pivoting platform 264. Preferably, second side stop 270 includes an operatively associated actuator for moving positioning surface 274 toward and away from the side of an empty box.

Ends stops 276 are secured to frame 232 adjacent support shaft 234, and extend outwardly from pivoting platform 264. A gripper 278 is secured to first end 258 of frame 232. Gripper 278 may be pivoted inward relative to first end 258 via an actuator 278 operably associated therewith by connecting hardware 279. An empty box is fed onto pivoting platform 264 by empty-box feeding conveyor 12, and slides over rollers 262 between positioning surfaces 272, 274 until the leading side of the box contacts end stops 276. Positioning surface 274 is moved inwardly against the side of the box via the associated actuator. Then, actuator 278 pivots gripper 278 inwardly and against the side of the box opposite the leading side, thereby securing the box on pivoting platform 264.

The secured box may then be pivoted about the axis of support shaft 234 in a first direction to a second position whereby pivoting platform 264 is aligned with matrix former 18. The box is pivoted about 160°, thereby inverting the open end of the box. The open end of the box is received by lift cage 214, so that the edge of the box rests against fingers 226 in a first position. Fingers 226 are then pivoted from the first position to a second position with respect to side supports 216, 218 by actuators 230, thereby maintaining the top edge of the box and/or flaps on the box in an open position aligned with matrix former 18. Moveable stops 217 on side supports 216, 218 may be moved inwardly by corresponding actuators, so that sufficient pressure is applied to the sides of the box to hold it in place in lift cage 214.

Once the empty box is secured by moveable stops 217 and fingers 226, lift cage 214 may then be moved toward matrix former 18, along guide tracks 210, as described above. Note that pivoting platform 264 does not move laterally with lift cage 214. Rather, the box is moved into position over matrix former 18 by lift cage 214. After lift cage 214 moves the box downwardly on guide tracks 210, rollover assembly 204 may be pivoted about the axis of support shaft 234 in the second direction to the first position for receiving another empty box.

As noted above, matrix former 18 of packing apparatus 200 is identical to the matrix former 18 described in the first embodiment. As such, a detailed description of same will not be repeated hereafter.

Figure 26:
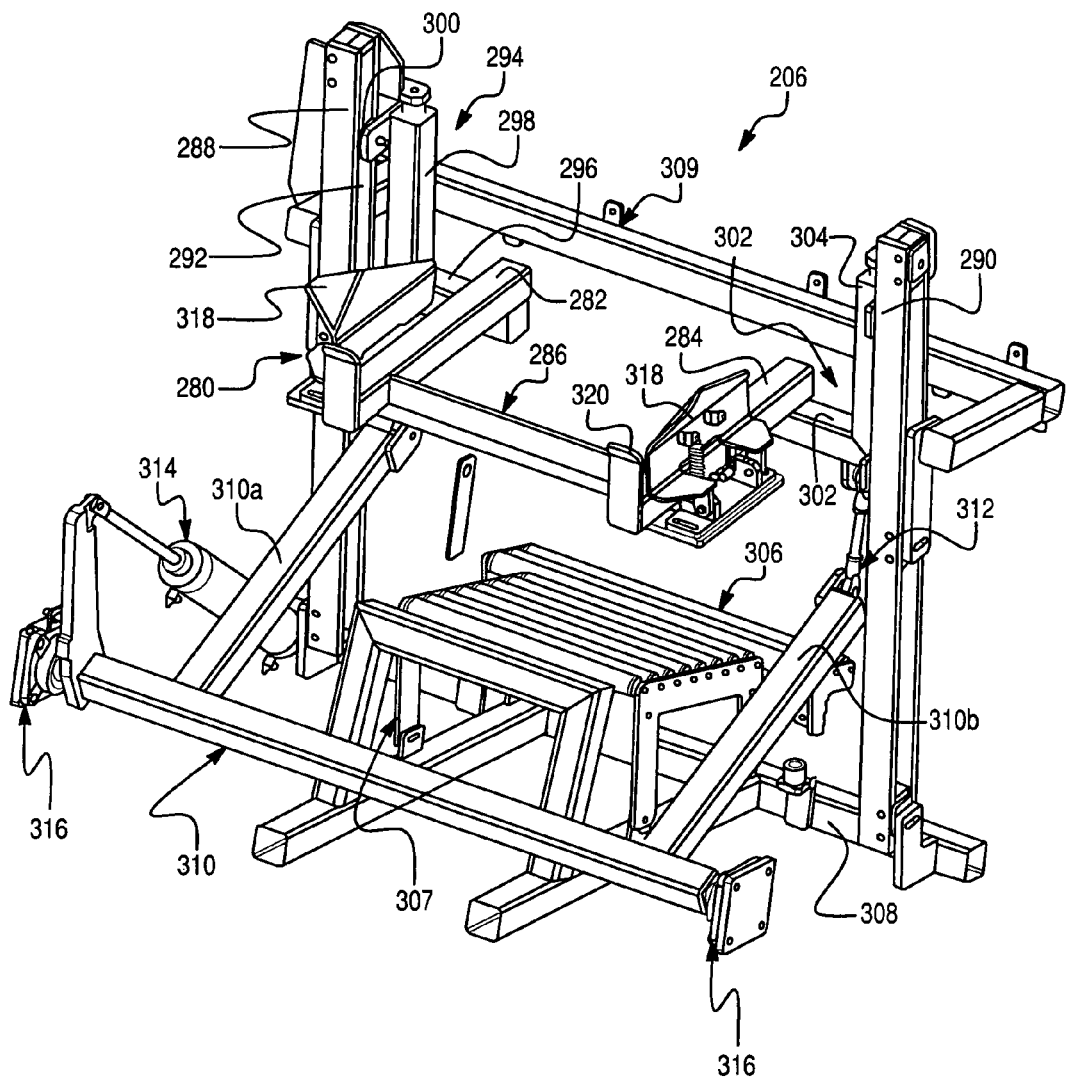
FIG. 26 is a perspective view of a lowerator assembly according to the second embodiment.
Figure 27:
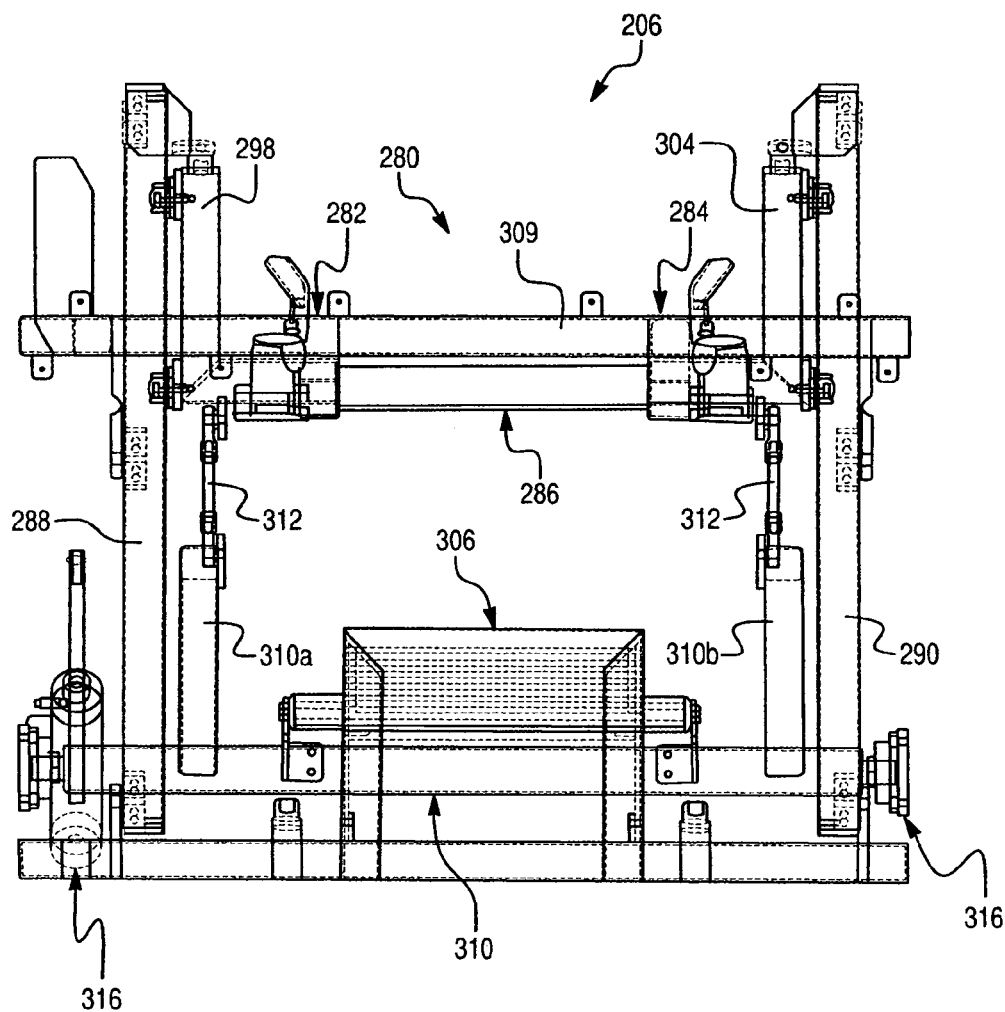
FIG. 27 is a front elevational view of the lowerator assembly of the second embodiment with portions shown in phantom.
Figure 28:
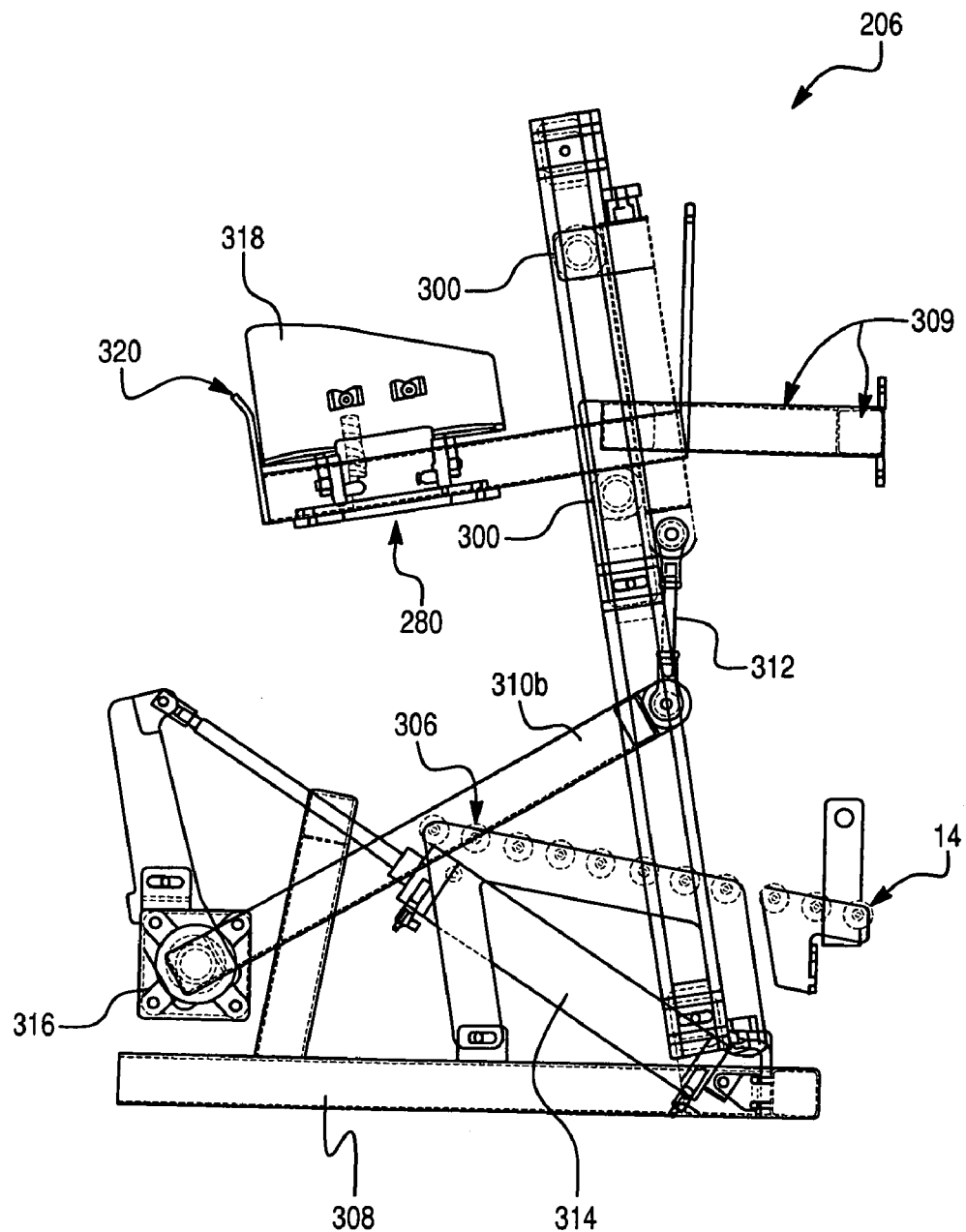
FIG. 28 is a side elevational view of the lowerator assembly of the second embodiment with portions shown in phantom.

As best shown in FIGS. 26–28, lowerator assembly 206 includes a carriage 280 having spaced, first and second side beams 282, 284, and a support bar 286 extending between and connected to first and second side beams 282, 284. Lowerator assembly 206 also includes spaced, first and second rails 288, 290, which each have a channel 292. A first L-shaped member 294 has a first leg 296 secured to first side beam 282. A second leg 298 of L-shaped member 294 includes wheels 300, which engage channel 292 of first rail 288. A second L-shaped member 302 has a first leg 302 secured to second side beam 284, and a second leg 304 having wheels 300 that engage channel 292 of second rail 290.

A discharge roller 306 is provided intermediate rails 288, 290, adjacent packed box discharge conveyor 14. A support frame 307 supports discharge roller. Preferably, first and second side beams 282, 284 and support bar 286 are configured so that carriage 280 may be moved along rails 288, 290 below discharge roller 306 relative to a lower cross beam 308, as best shown in FIG. 26 and 27.

A U-shaped member 310 may be provided, which opposing legs 310a and 310b operatively secured to L-shaped members 294, 302, respectively via shafts 312. U-shaped member, in turn, may be operatively associated with an actuator 314, which pivots U-shaped member 310. As U-shaped member 310 is pivoted, carriage 280 is caused to move along rails 288, 290. Brackets 316 on U-shaped member 310 may be secured to a support structure (not shown). An additional upper support member 309 may also be provided, extending between rails 288, 290.

Carriage 280 is positioned adjacent matrix former 18, so that when matrix former 18 pivots a packed box about the axis of shaft 100 (as described above in the first embodiment), the packed box is inverted so that its bottom rests on first and second side beams 282, 284 of carriage 280. The packed box is held in place as it is pivoted on matrix former 18 by the inertia of the rotation. The box is then released by matrix former 18 onto carriage 280 by gravity. Spring clamps 318 and end bars 320 may be provided on carriage 280. Spring clamps 318 extend from side beams 282, 284 and engage the sidewalls of the box, holding the box in place on carriage 280 as it is being released by matrix former 18. If an empty box, or relatively lightweight box, is pivoted onto carriage 280, the box is grasped by clamps 318 to ensure that it will be released by matrix former 18. End bars 320 also ensure proper placement of the box on side beams 282, 284.

After the box has been released onto carriage 280, carriage 280 moves downwardly along rails 288, 290 toward discharge roller 306. The bottom of the box contacts discharge roller 306. Carriage 280 continues to move downwardly along rails 288, 290, past discharge roller 306, until carriage 280 is clear of the box. Thus, the packed box is placed on discharge roller 306 by carriage 280. Discharge roller 306 is preferably angled downward slightly relative to support bar 286 and matrix former 18. As such, the box rolls down discharge roller 306, and onto packed box discharge conveyor 14.

During operation, an empty box is fed onto pivoting platform 264 via empty-box feeding conveyor 12. The box is positioned between side stops 268, 270, rolling into place against end stops 276. Positioning surface 274 is moved against the side of the box via an associated actuator. Gripper 278 then pivots into place against the box, holding the box in place on pivoting platform 264 in a first position. Pivoting platform then pivots about the axis of support shaft 234 in a first direction into a second position, thereby inverting the box. The open end of the box is aligned with matrix former 18 in the second position. The open end of the box is received by lift cage 214, between moveable plates 241 and fingers 226 of first and second side supports 216, 218. The edge of the open end of the box rests against corresponding fingers 226 on first and second side supports 216, 218. Gripper 278 is pivoted away from the box, thereby releasing the box onto fingers 226. Moveable plates 241 move inwardly against the sides of the box, thereby holding it in place. Moveable arms 228, and thus fingers 226, are then moved inwardly toward the sides of the box. Fingers 226 are then pivoted from a first position to second position with respect to the edge of the box. Fingers 226 maintain the edge of the box and/or flaps of the box in alignment with matrix former 18 in the second position.

The box is held in position by fingers 226 and moveable plates 241 as lift cage 214 is moved toward matrix former 18 along guide tracks 210. Preferably, the positioning of moveable plates 241 may be adjusted for different box sizes, so that positioning sides 251 are aligned with the corners of the box. After lift cage 214 moves away from rollover assembly 204, pivoting platform 264 may be pivoted in the second direction to the first position for receiving another empty box.

Lift cage 214 moves toward matrix former 18, with the opening of the box facing the stacks of patties or other product on matrix former 18. Note that the patties or other product are received on matrix former 18 as described in the first embodiment. Lift cage 214 slides along guide tracks 210 until the patty-filled matrix former 18 is inside the box. Fingers 226 are then pivoted back to the first position, and arms 228 and moveable plates 241 are moved away from the sides of the box, thereby releasing the box onto matrix former 18. Matrix former 18 then pivots about the axis of shaft 100, and the packed box is inverted onto first and second side beams 282, 284 of carriage 280. The box is released by matrix 18 onto carriage 280 by gravity. After the box has been released onto carriage 280, carriage 280 moves downward along rails 288, 290 toward discharge roller 306. Carriage 280 continues to slide downwardly along rails 288, 290, past discharge roller 306, until carriage 280 is clear of the box and the packed box is placed on discharge roller 306, as described above. The packed box rolls down discharge roller 306, and onto packed box discharge conveyor 14.

The present invention has been described herein in terms of preferred embodiments. However, numerous changes and additions to these embodiments will become apparent to those skilled in the relevant art upon a reading and understanding of the foregoing description. For example, while the matrix former of the present invention has been described as accommodating two rows of three stacks each, it can readily be adapted, by the use of larger or smaller components, have more or fewer slots in the bottom wall, to accommodate rows having a greater or lesser number of stacks and to accommodate a greater or lesser number of rows as well. It is intended that all such changes and additions be included within this invention to the extent that they are covered by scope of the several claims appended hereto.

What is claimed is:

1. A packing apparatus, comprising:
    a matrix former having a product contact surface pivotable about a first axis between a first position and a second position, wherein said product contact surface faces in a first direction in said first position, and said product contact surface faces in a second direction in said second position;
    a platform pivotable about a second axis spaced from said first axis, said platform pivotable between a first position and a second position, wherein said platform faces in the first direction in said first position, and said platform faces in the second direction in said second position;
    a lift cage moveable between and aligned with said platform in said second position and said product contact surface of said matrix former in said first position, said lift cage for moving a box therebetween;
    a discharge roller; and
    a carriage moveable between and aligned with said product contact surface in said second position and said discharge roller.

2. The packing apparatus of claim 1, wherein said matrix former includes at least one sidewall movable relative to said product contact surface.

3. The packing apparatus of claim 1, further comprising at least one guide track for guiding the movement of said lift cage between said platform in said second position and said product contact surface in said first position.

4. The packing apparatus of claim 3, further comprising a drive belt extending between a first wheel and a second wheel and a drive operably coupled to said drive belt, wherein said lift cage is coupled to said drive belt.

5. The packing apparatus of claim 4, wherein said drive belt is parallel to at least a portion of said at least one guide track.

6. The packing apparatus of claim 1, wherein said lift cage includes first and second side supports, wherein the box is receivable between said side supports.

7. The packing apparatus of claim 6, wherein at least one of said side supports includes moveable plates that engage a side of the box thereby securing the box between said side supports.

8. The packing apparatus of claim 6, wherein at least one of said side supports includes fingers that grip an edge of the box thereby maintaining alignment of the box with said product contact surface in said first position.

9. The packing apparatus of claim 1, wherein said platform includes a gripper for securing the box to said platform.

10. The packing apparatus of claim 1, further comprising at least one box positioning surface extending outwardly from and perpendicular to said platform.

11. The packing apparatus of claim 1, wherein said platform includes rollers aligned with said second axis.

12. The packing apparatus of claim 1, further comprising at least one guide track for guiding the movement of said carriage between said product contact surface in said second position and said discharge roller.

13. The packing apparatus of claim 12, further comprising a discharge conveyor for receiving boxes from said discharge roller.

14. The packing apparatus of claim 1, further comprising a feed conveyor for feeding boxes to said platform.

* * * * *